United States Patent
Irani et al.

(10) Patent No.: US 7,596,281 B2
(45) Date of Patent: Sep. 29, 2009

(54) APPARATUS AND METHOD FOR ALIGNMENT OF SPATIAL OR TEMPORAL NON-OVERLAPPING IMAGES SEQUENCES

(75) Inventors: Michal Irani, Rehovot (IL); Yaron Caspi, Ness Ziona (IL)

(73) Assignee: Yeda Research and Development Co. Ltd., Rehovot (IL)

(*) Notice: Subject to any disclaimer, the term of this patent is extended or adjusted under 35 U.S.C. 154(b) by 887 days.

(21) Appl. No.: 10/433,526

(22) PCT Filed: Dec. 4, 2001

(86) PCT No.: PCT/IL01/01120
§ 371 (c)(1),
(2), (4) Date: Nov. 13, 2003

(87) PCT Pub. No.: WO02/47031
PCT Pub. Date: Jun. 13, 2002

(65) Prior Publication Data
US 2004/0071367 A1 Apr. 15, 2004

(51) Int. Cl.
G06K 9/36 (2006.01)
G06K 9/32 (2006.01)
(52) U.S. Cl. ..................... 382/276; 382/294
(58) Field of Classification Search .......... 382/276, 382/294, 300, 312, 291, 295, 296, 284; 348/47, 348/48, 416, 513; 345/648, 672, 677; 375/240.18; 709/231
See application file for complete search history.

(56) References Cited

U.S. PATENT DOCUMENTS

| | | | |
|---|---|---|---|
| 4,192,004 A * | 3/1980 | Buerger | ............ 382/204 |
| 4,720,633 A | 1/1988 | Nelson | |
| 4,880,976 A | 11/1989 | Mancuso et al. | |
| 5,294,978 A * | 3/1994 | Katayama | ........... 375/240.12 |
| 5,412,211 A | 5/1995 | Knowles | |
| 5,523,786 A | 6/1996 | Parulski | |
| 5,789,748 A | 8/1998 | Liu et al. | |
| 5,798,798 A | 8/1998 | Rector et al. | |
| 5,892,554 A | 4/1999 | DiCicco et al. | |
| 5,920,657 A | 7/1999 | Bender et al. | |
| 5,982,350 A | 11/1999 | Hekmatpour et al. | |
| 5,987,164 A | 11/1999 | Szeliski et al. | |
| 5,988,863 A * | 11/1999 | Demos | ................ 708/203 |
| 5,999,662 A | 12/1999 | Burt et al. | |
| 6,075,905 A | 6/2000 | Herman et al. | |
| 6,078,701 A | 6/2000 | Hsu et al. | |
| 6,320,624 B1 | 11/2001 | Ayer et al. | |
| 6,340,991 B1 * | 1/2002 | Chen et al. | ............ 348/513 |
| 6,393,163 B1 | 5/2002 | Burt et al. | |

(Continued)

FOREIGN PATENT DOCUMENTS

EP 0 551 595 7/1993

(Continued)

OTHER PUBLICATIONS

Niki Pissinou et al. (A Topological-Directional Model for the Spatio-Temporal Composition of Video Objects, IEEE, Feb. 1998, pp. 17-24).*

(Continued)

*Primary Examiner*—Kanji Patel
(74) *Attorney, Agent, or Firm*—Ladas & Parry LLP

(57) ABSTRACT

A method and system for computing at least one of spatial and temporal relationships between at least first and second sequences of representations having respective first and second temporal progressions and including employing the first and second temporal progressions to obtain at least one of the spatial and temporal relationships.

52 Claims, 24 Drawing Sheets

U.S. PATENT DOCUMENTS

| | | | |
|---|---|---|---|
| 6,400,831 B2 * | 6/2002 | Lee et al. | 382/103 |
| 6,442,163 B1 | 8/2002 | Chopping | |
| 6,447,450 B1 | 9/2002 | Olstad | |
| 6,459,482 B1 | 10/2002 | Singh et al. | |
| 6,482,090 B1 | 11/2002 | Rimoto et al. | |
| 6,501,794 B1 * | 12/2002 | Wang et al. | 375/240.08 |
| 6,564,263 B1 * | 5/2003 | Bergman et al. | 709/231 |
| 6,714,216 B2 | 3/2004 | Abe | |

FOREIGN PATENT DOCUMENTS

| | | |
|---|---|---|
| JP | 2000-76423 | 3/2000 |
| WO | 96/15508 | 5/1996 |
| WO | WO 99/37088 | 7/1999 |

OTHER PUBLICATIONS

P.H.S. Torr, et al. Feature based methods for structure and motion estimation. Microsoft Research Ltd, Cambridge, UK. 2000.

G.P. Stein. Tracking from multiple view points: Self-calibration of space and time. In DARPA IU Workshop, pp. 1037-1042, 1998.

R.Y. Tsai, et al. A new technique for full autonomous and efficient 3D robotics hand/eye calibration. IEEE Journal of Robotics and Automation, 5(3):345-358, Jun. 1989.

P. Viola, et al. Alignment by maximization of mutual information. In International Conference on Computer Vision, pp. 16-23, 1995.

A. Zisserman, et al. Metric calibration of a stereo rig. In Workshop on Representations of Visual Scenes, pp. 93-100, 1995.

Z. Zhang, et al. A robust technique for matching two uncalibrated images through the recovery of the unknown epipolar geometry. Artificial Intelligence, 78:87-119, 1995.

Y. Caspi, et al. Alignment of non-over lapping sequences, computer Vision 2001, ICCV 2001. Proceedings Eighth IEEE International Conference on vol. 2, pp. 76-83.

M. Irani, et al. About direct methods. In Vision Algorithms Workshop, pp. 267-277, Corfu, 1999.

M. Irani, et al. From reference frames to reference Planes: Multi-view parallax geometry and applications. In European Conference on Computer Vision, Freiburg, Jun. 1998.

M. Irani, et al. Computing occluding and transparent motions. International Journal of Computer Vision, 12(1):5-16, Jan. 1994.

R. Kumar, et al. Direct recovery of shape from multiple views: parallax based approach. In International Conference on Pattern Recognition, 1994.

Harpreet Sawhney. 3D geometry from planar parallax. In IEEE Conference on Computer Vision and Pattern Recognition, Jun. 1994.

A. Shashua, et al. Relative affine structure: Theory and application to 3D reconstruction from perspective views. In IEEE Conference on Computer Vision and Pattern Recognition, pp. 483-489, Seattle, WA, Jun. 1994.

F.R. Gantmakher. The theory of matrices, Chapter VIII, Chelsea Pub., New York, 1959.

Gene Golub, et al. Matrix computations. The Johns Hopkins University Press. Baltimore and London, pp. 123-127, 1989.

Richard I. Hartley. In Defence of the 8-point Algorithm. In Pattern Recognition and Machine Intelligence 19 (6) Jun. 1997, pp. 580-593.

R. Hartley, et al. Mutliple view geometry in computer vision. Chapter 3, Cambridge University press, Cambridge, 2000.

R. Horaud, et al. Reconstruction using motions of a stereo rig. In International Conference on Computer Vison, pp. 96-103, 1998.

R. Horaud, et al. Hand-eye calibration. International Journal of Robotics Research, 14(3):195-210, Jun. 1995.

S. Avidan, et al. Threading fundamental matrices. In European Conference on Computer Vision, 1998.

P.A. Beardsley, et al. 3D model acquisition from extended image sequences. In Proc. 4$^{th}$ European Conference on Computer Vision, LNCS 1065, Cambridge, pp. 683-695, 1996.

P.R. Burt, et al. Enhanced image capture through fusion. In International Conference on Computer Vision, 1993.

Y. Caspi, et al. A Step towards sequence-to-sequence alignment. In IEEE Conference on Computer Vision and Pattern Recognition, Hilton Head Island, South Carolina, Jun. 2000.

D. Demirdijian, et al. Stereo autocalibration from one plane. In European Conference on Computer Vision, 2000.

Y. Dufournaud, et al. Matching images with different resolutions. In IEEE Conference on Computer Vision and Pattern Recognition, Hilton Head Island, South Carolina, Jun. 2000.

Harris, C., et al. "A Combined Corner and Edge Detector" 4$^{th}$ In *Alvey Vision Conference* (1998).

Bergen, J.R., et al. "A Three Frame Algorithm For Estimating Two-Component Image Motion" In *IEEE Trans on Pattern Analysis and Machine Intelligence* 14, (1992), pp. 886-896.

Irani, M., et al. "Detecting and Tracking Multiple Moving Objects Using Temporal Integration" In *European Conference on Computer Vision*, (1992), Santa Margarita Ligure, pp. 282-287.

Horn, B., et al "Determining Optical Flow" *Artificial Intelligence* 17, (1981), pp. 185-203, Abstract.

Hanna, K.J., "Direct Multi-resolution Estimation of Ego-motion and Structure from Motion" In *IEEE Workshop on Visual Motion*, (1991), pp. 156-162, Princeton, NJ.

Irani, M., et al. "Efficient Representations of Video Sequences and Their Applications" *Image Communication Special issue on Image and Video Semantics: Processing, Analysis and Application* 8, (1996), pp. 1-39.

Bergen, J.R., et al. "Hierarchical Model based Motion Estimation" In *European Conference on Computer Vision*, (1992), pp. 237-252.

Irani, M., et al. "Parallax Geometry of Pairs of Points for 3D Scene Analysis" In *European Conference on Computer Vision*, Cambridge UK, (1996), pp. 1-29.

Burt, P., et al. "The Laplacian Pyramid as a Compact Image Code" In *IEEE Transactions on Communications* 31, (1983), pp. 532-540.

Faugeras, O. "Three-Dimensional Computer Vision" *A Geometric Viewpoint MIT Press*, Cambridge, Mass. (1996).

Esp@cenet english Abstract of JP2000076423 dated Mar. 14, 2000.

Irani, et al., "Recovery of Ego-Motion Using Region Alignment", IEEE Transactions on Pattern Analysis and Machine Intelligence, vol. 19, No. 3, Mar. 1997, pp. 268-272.

Sawhney, H., et al., "True Multi-Image Alignment and its Application to Mosaicing and Lens Distortion Correction", IEEE Conference of computer Vision and Pattern Recognition, 1997, pp. 450-456.

Giese, M. A., et al., "Synthesis and Recognition of Biological Motion Patterns on Linear Superposition Prototypical Motion Sequences", International Conference of computer Vision, 1998, pp. 73-80.

Grimson, E., et al. "A Forest of Sensors", International Conference of Computer Vision, 1997, pp. 45-50.

Fischler, M. A. And Bolles, R. C., "Ransac random sample consensus: a paradigm for model fitting with applications to image analysis and automated cartography", In Communications of the ACM, 1981, vol. 26, pp. 381-395.

Reid, I., et al., Goal-Directed Videoo Metrology, European Conference on Computer Vision, 1996, pp. 647-658.

Szelski, R., et al., "Creating Full View Panoramic Image Mosaics and Environment Maps", Computer Graphics Proceedings, Annual Conference Series, 8, 1997.

Irani, M., et al., "Robust Multi-Sensor Image Alignment", IEEE International Conference of Computer Vision (ICCV), India, Jan. 1998, pp. 959-966.

Lee et al., "Monitoring Activities from Multiple video Streams: Establishing a Common Coordinate Frame", IEEE Trans. On Pattern Analysis and Machine Intelligence, (Special Issue on Video Surveillance and Monitoring), 2000, vol. 27, No. 8, pp. 758-767 .

F.R. Hampel et al., "Robust Statistics: The Approach Based on Influence Functions", John Wiley, New York, 1986, Abstract.

* cited by examiner

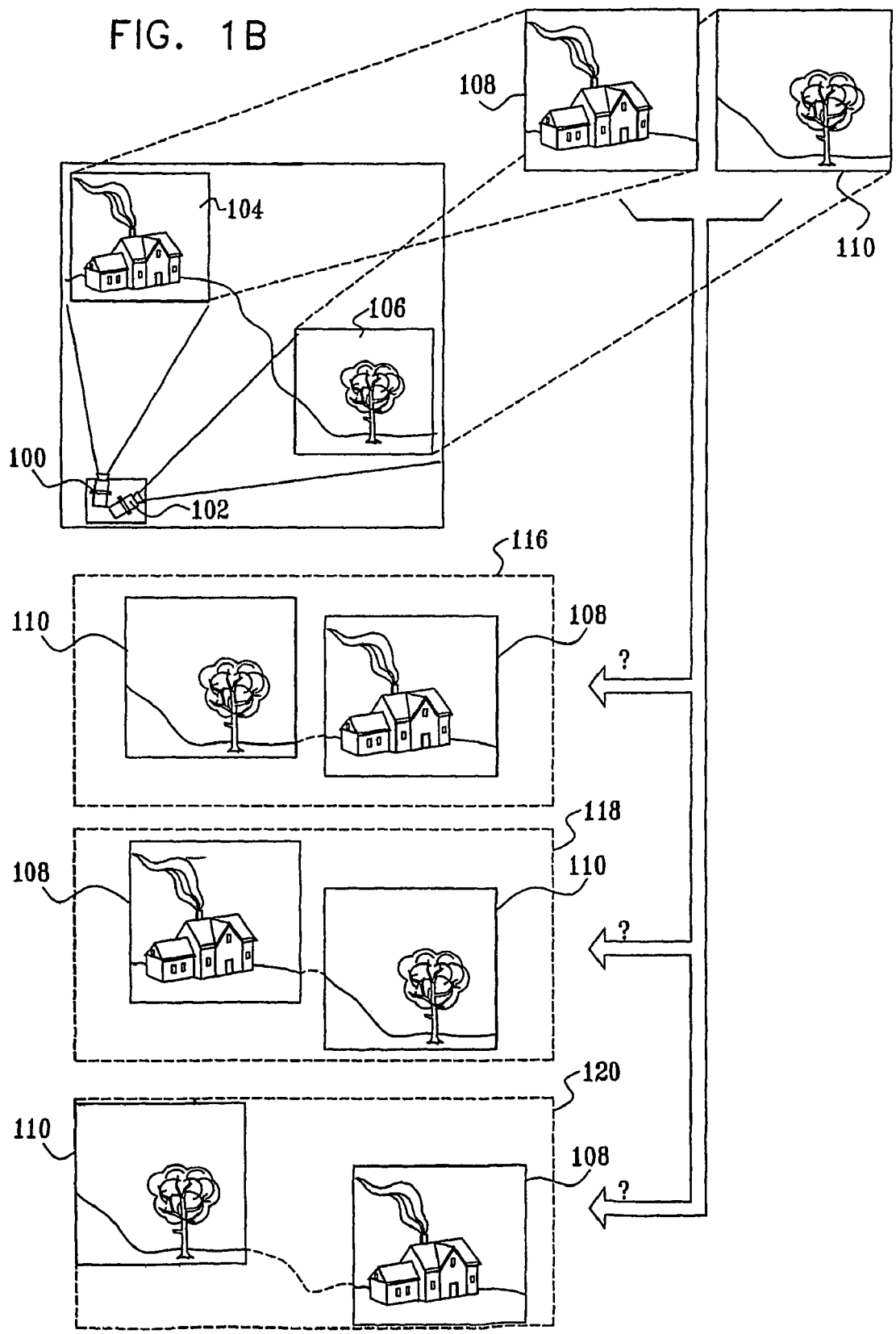

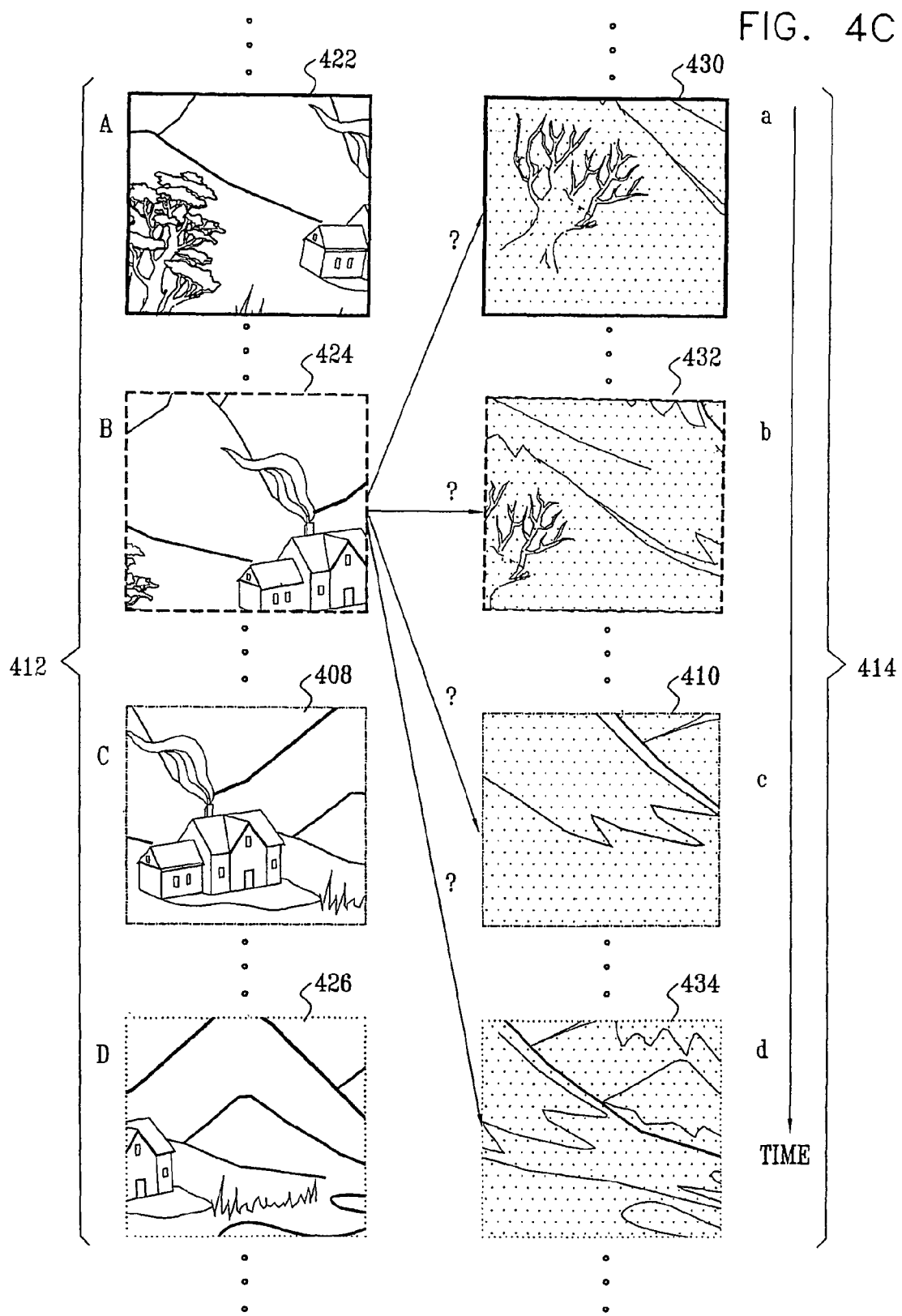

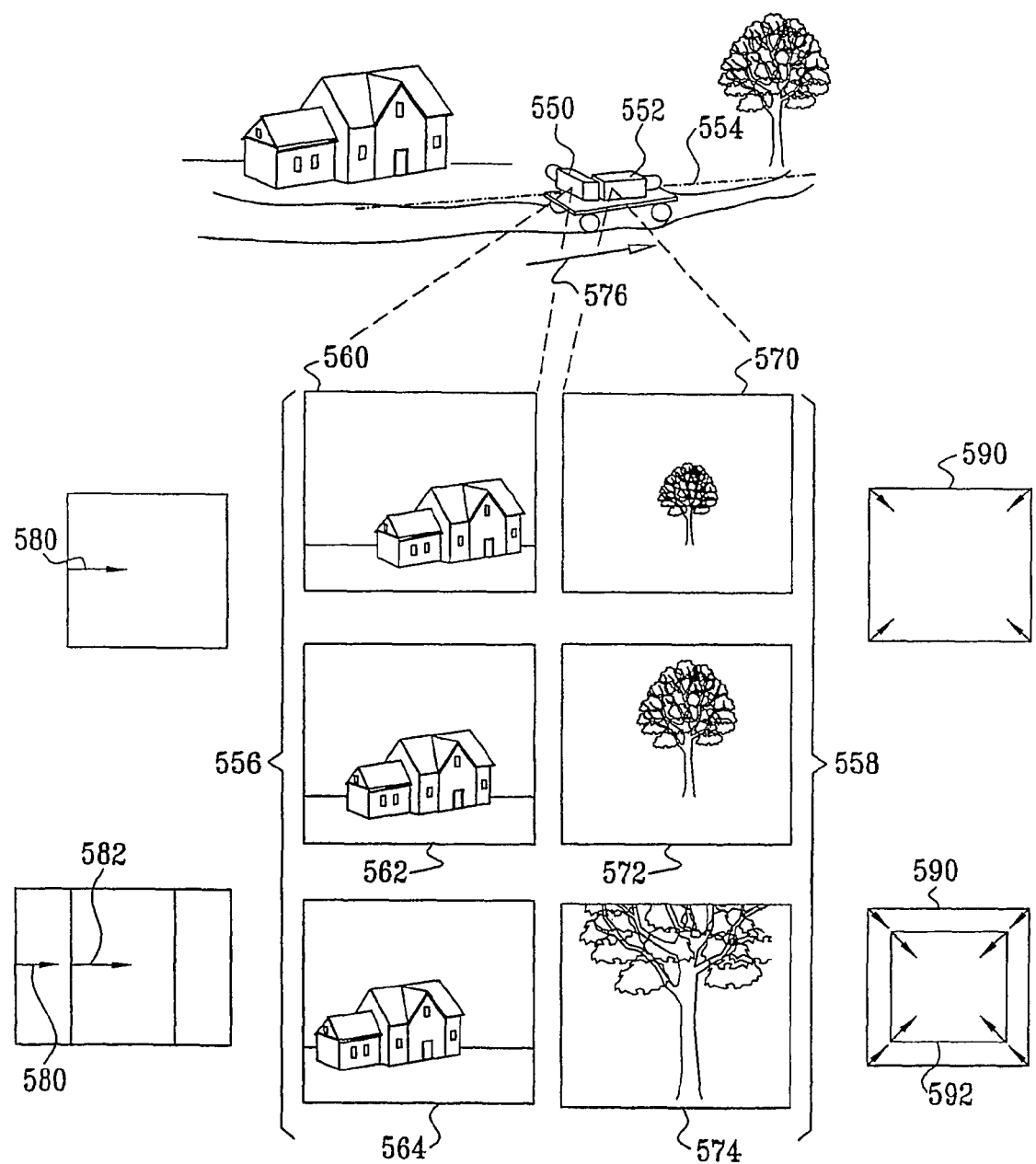

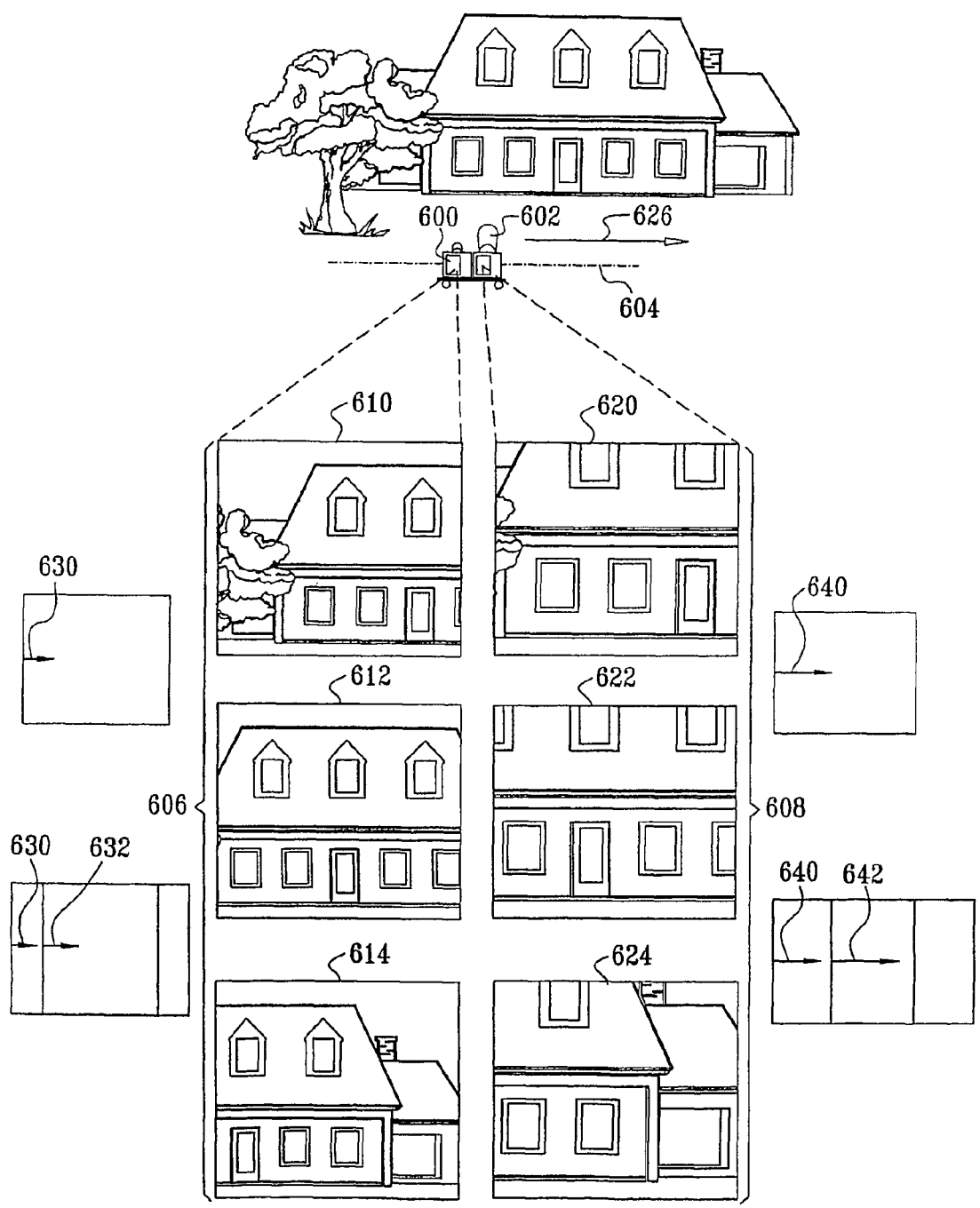

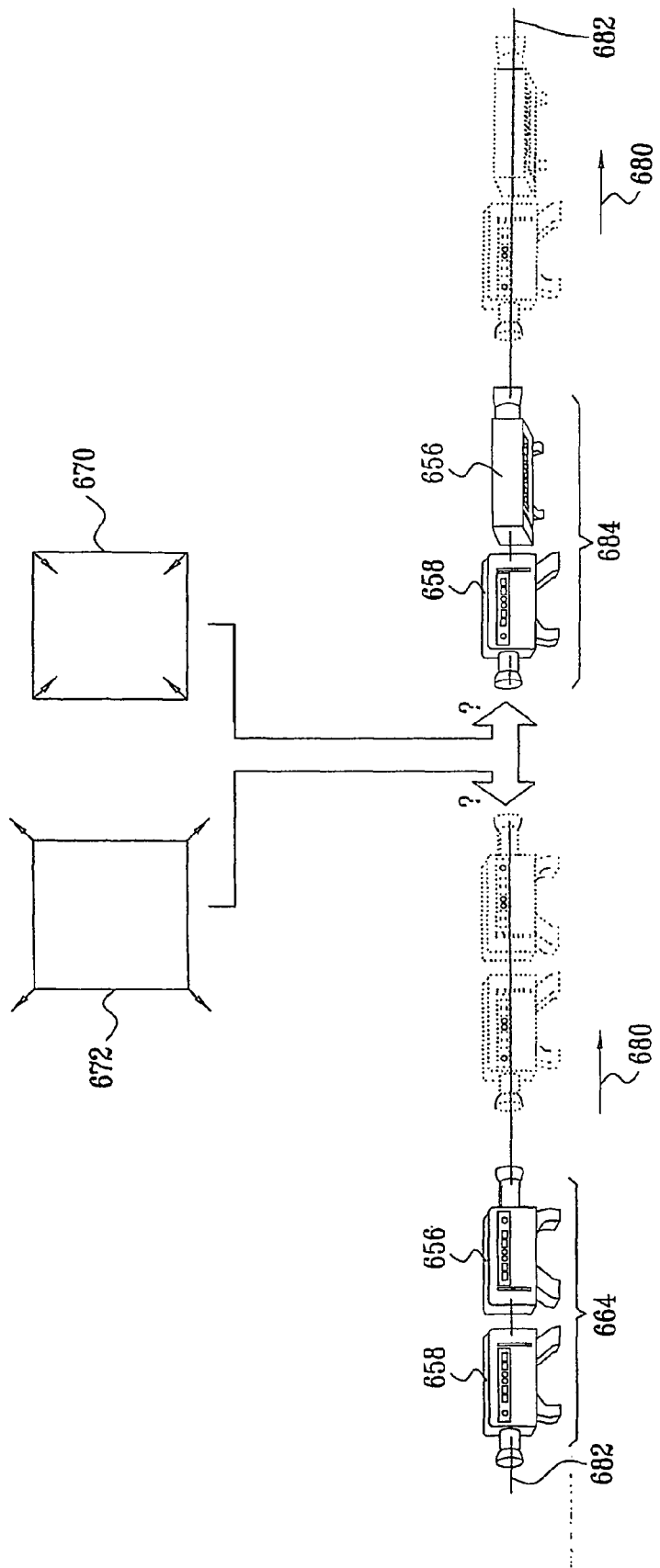

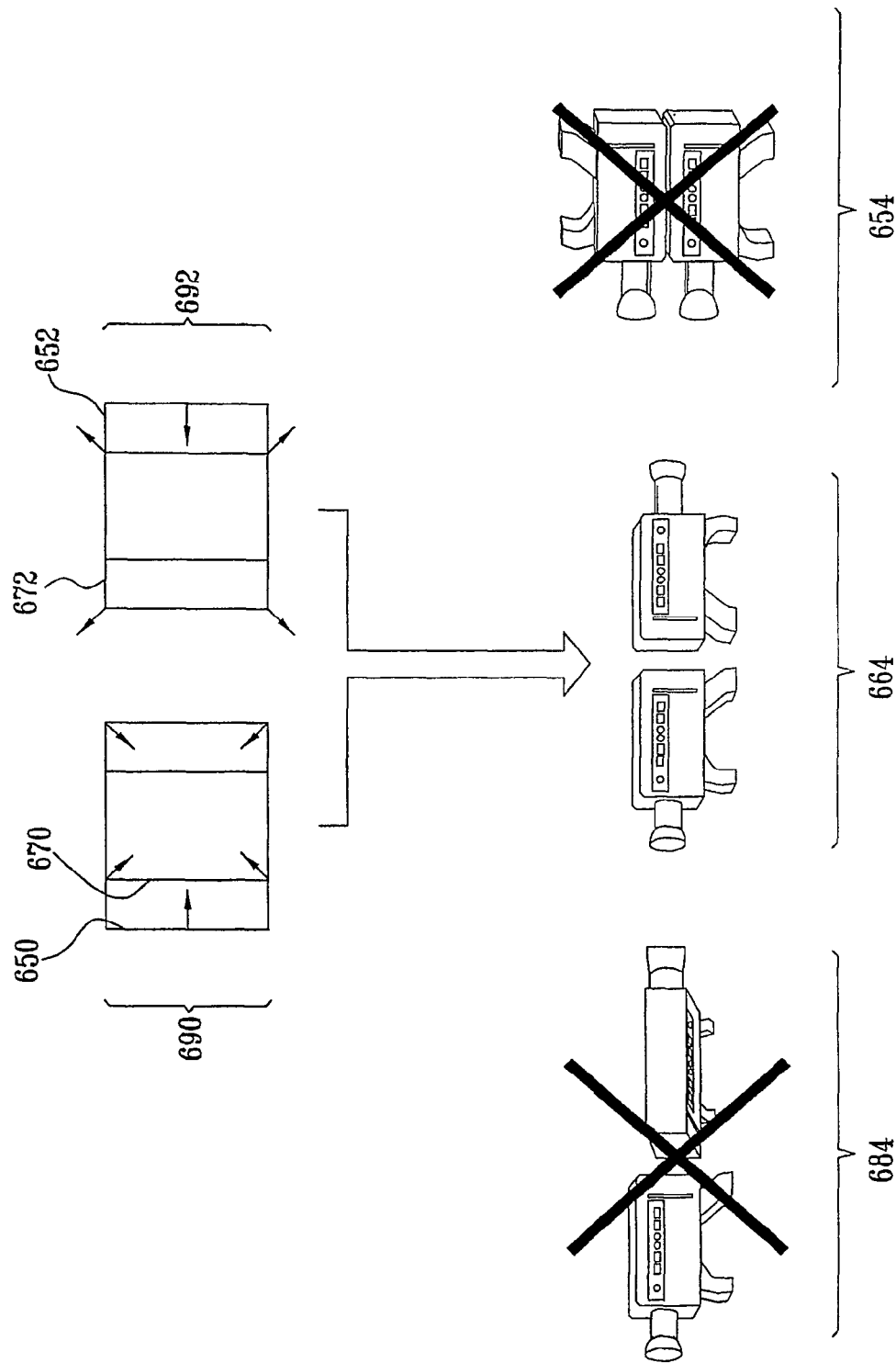

APPARATUS AND METHOD FOR ALIGNMENT OF SPATIAL OR TEMPORAL NON-OVERLAPPING IMAGES SEQUENCES

FIELD OF THE INVENTION

The present invention relates to methodologies and systems for combining and integrating visual information from various sources.

BACKGROUND OF THE INVENTION

The problem of image alignment or image registration has been extensively researched and successful methods for solving this problem have been developed. Some of these methods are based on matching extracted local image features. Other approaches are based on directly matching image intensities. However, all these methods share one basic assumption: that there is sufficient overlap between the images to allow extraction of common image properties, namely, that there is sufficient "similarity" between the images. The term similarity is used here in the broadest sense, for example: gray-level similarity, feature similarity, similarity of frequencies and statistical similarity, such as mutual information. Consequently, the prior art does not provide alignment between images where there is very little similarity between the images or where there is no spatial overlap between the images.

However, a sequence of images contains much more information than any individual image does. For example: a sequence of images of a scene contains temporal changes caused by dynamic changes in the scene, or temporal changes induced by the motion of the camera. This information is employed by the present invention to provide alignment between images of the two sequences of images even when the sequences have no spatial overlap or have very low similarity.

State of the art methods for sequence-to-sequence alignment, and other relevant technologies, are described in:

[1] S. Avidan and A. Shashua. Threading fundamental matrices. In European Conference on Computer Vision, 1998.
[2] P. A. Beardsley, P. H. S. Torr and A. Zisserman. 3D model acquisition from extended image sequences. In Proc. $4^{th}$ European Conference on Computer Vision, LNCS 1065, Cambridge, pages 683-695, 1996.
[3] P. R. Burt and R. J. Kolczynski. Enhanced image capture through fusion. In International Conference on Computer Vision, 1993.
[4] Y. Caspi and M. Irani. A step towards sequence-to-sequence alignment. In IEEE Conference on Computer Vision and Pattern Recognition, Hilton Head Island, S.C., June 2000.
[5] D. Demirdijian, A. Zisserman and R. Horaud. Stereo autocalibration from one plane. In European Conference on Computer Vision, 2000.
[6] Y. Dufournaud, C. Schmid and R. Horaud. Matching images with different resolutions. In IEEE Conference on Computer Vision and Pattern Recognition, Hilton Head Island, S.C., June 2000.
[7] C. E. Pearson (ed). Handbook of applied mathematics— Second Edition. Van Nostrand Reinhold Company, New York, 1983, pp 898.
[8] F. R. Gantmakher. The theory of matrices. Chapter VIII, Chelsea Pub., New York, 1959.
[9] Gene Golub and Charles Van Loan. Matrix Computations. The Johns Hopkins University Press, Baltimore and London, pp. 123-127, 1989

[10] Richard I. Hartley. In Defence of the 8-point Algorithm. In Pattern Recognition and Machine Intelligence 19 (6) June pages 580-593 1997
[11] R. Hartley and A. Zisserman. Multiple View Geometry in Computer Vision. Chapter 3, Cambridge university press, Cambridge, 2000.
[12] R. Horaud and G. Csurka. Reconstruction using motions of a stereo rig. In International Conference on Computer Vision, pages 96-103, 1998.
[13] R. Horaud and F. Dornaika. Hand-eye calibration. International Journal of Robotics Research, 14(3):195-210, June 1995.
[14] M. Irani and P. Anandan. About direct methods. In Vision Algorithms Workshop, pages 267-277, Corfu, 1999.
[15] M. Irani, P. Anandan and D. Weinshall. From reference frames to reference planes: Multi-view parallax geometry and applications. In European Conference on Computer Vision, Freiburg, June 1998.
[16] M. Irani, B. Rousso and S. Peleg. Computing occluding and transparent motions. International Journal of Computer Vision, 12(1):5-16, January 1994.
[17] R. Kumar, P. Anandan and K. Hanna. Direct recovery of shape from multiple views: parallax based approach. In International Conference on Pattern Recognition, 1994.
[18] Harpreet Sawhney. 3D geometry from planar parallax. In IEEE Conference on Computer Vision and Pattern Recognition, June 1994.
[19] A. Shashua and N. Navab. Relative affine structure: Theory and application to 3D reconstruction from perspective views. In IEEE Conference on Computer Vision and Pattern Recognition, pages 483-489, Seattle, Wash., June 1994.
[20] G. P. Stein. Tracking from multiple view points: Self-calibration of space and time. In DARPA IU Workshop, pages 1037-1042, 1998.
[21] P. H. S. Torr and A. Zisserman. Feature based methods for structure and motion estimation. In Vision Algorithms Workshop, pages 279-329, Corfu, 1999.
[22] R. Y. Tsai and R. K. Lenz. A new technique for full autonomous and efficient. 3D robotics hand/eye calibration. IEEE Journal of Robotics and Automation, 5(3):345-358, June 1989.
[23] P. Viola and W. Wells III. Alignment by maximization of mutual information. In International Conference on Computer Vision, pages 16-23, 1995.
[24] A. Zisserman, P. A. Beardsley and I. D. Reid. Metric calibration of a stereo rig. In Workshop on Representations of Visual Scenes, pages 93-100, 1995.
[25] P. H. S. Torr and A. Zisserman. Feature based methods for structure and motion estimation. In Vision Algorithms Workshop, pages 279-290, Corfu, 1999.
[26] Z. Zhang, R. Deriche, O. Faugeras, and Q. Luong. A robust technique for matching two uncalibrated images through the recovery of the unknown epipolar geometry. Artificial Intelligence, 78:87-119, 1995.

The disclosures of all publications mentioned in the specification and of the publications cited therein are hereby incorporated by reference.

SUMMARY OF THE INVENTION

This invention seeks to provide methodologies and systems for combining and integrating visual information from various sources.

The present invention replaces a requirement of "coherent appearance", which is a fundamental assumption in prior art image alignment methods, with a requirement of "consistent temporal behavior". The requirement of "consistent temporal behavior" is easier to satisfy, for example by producing two sequences of images using two cameras moved jointly in space. The present invention is therefore useful not only in cases of non-overlapping sequences, but also in cases which are inherently difficult for standard image alignment techniques.

In a preferred embodiment of the present invention the two cameras are attached closely to each other, so that their centers of projection are very close, and move jointly in space. In this case the induced frame-to-frame transformations within each sequence have correlated behavior across the two sequences.

A preferred embodiment of the present invention employs correlated temporal behavior to resolve both spatial and temporal transformations between images of the two sequences.

The present invention is therefore useful for a variety of real-world applications, including:

(i) Multi-sensor alignment for image fusion. This requires accurate alignment of images obtained by sensors of different sensing modalities, such as Infra-Red and visible light. Such images differ significantly in their appearance due to different sensor properties.

(ii) Alignment of image sequences obtained at different zooms. The problem here is that different image features are prominent at different image resolutions. Alignment of a wide-field-of-view sequence with a narrow-field-of-view sequence is useful for detecting small zoomed-in objects inside or outside a zoomed-out view of the scene. This can be useful in surveillance applications.

(iii) Generation of wide-screen movies from multiple non-overlapping narrow FOV movies, such as in IMAX™ movies.

It is appreciated that the term "correlated" as used in the specification and claims of the present application includes inter alia the following: mathematical correlation, statistical correlation and any other co-relationship.

There is thus provided in accordance with a preferred embodiment of the present invention a method for computing at least one of spatial and temporal relationships between at least first and second sequences of representations having respective first and second temporal progressions. The method includes employing the first and second temporal progressions to obtain at least one of the spatial and temporal relationships.

There is also provided in accordance with a preferred embodiment of the present invention a method for computing at least one of spatial and temporal relationships between at least first and second sequences of representations having respective first and second temporal progressions. The method includes employing only the first and second temporal progressions to obtain at least one of the spatial and temporal relationships.

There is further provided in accordance with a preferred embodiment of the present invention a system for computing at least one of spatial and temporal relationships between at least first and second sequences of representations having respective first and second temporal progressions. The system includes input functionality for receiving the first sequence of representations and the first temporal progression and the second sequence of representations and the second temporal progression and computation functionality employing at least one of the first sequence of representations and the first temporal progression and at least one of the second sequence of representations and the second temporal progression to obtain at least one of the spatial and temporal relationships.

There is further provided in accordance with another preferred embodiment of the present invention a system for computing at least one of spatial and temporal relationships between at least first and second sequences of representations having respective first and second temporal progressions. The system includes input functionality for receiving the first and second temporal progressions and computational functionality employing the first and second temporal progressions to obtain at least one of the spatial and temporal relationships.

Further in accordance with a preferred embodiment of the present invention the method also includes computing the first and second temporal progressions which are then employed to obtain at least one of the spatial and temporal relationships.

Preferably, the representations include visual representations, images and at least three-dimensional objects.

Still further in accordance with a preferred embodiment of the present invention the step of employing obtains the spatial relationship, and/or the temporal relationship.

Additionally in accordance with a preferred embodiment of the present invention the employing step obtains the spatial and temporal relationships in the absence of a spatial overlap between the representations Additionally or alternatively, the employing step obtains the spatial and temporal relationships in the absence of common spatial information between the representations.

Further in accordance with a preferred embodiment of the present invention the step of employing obtains the spatial and temporal relationships in the absence of common information between individual ones of the representations belonging to different ones of the at least first and second sequences.

Still further in accordance with a preferred embodiment of the present invention the step of employing obtains the spatial and temporal relationships in the absence of common information between any individual ones of the representations belonging to different ones of the at least first and second sequences.

Additionally in accordance with a preferred embodiment of the present invention the spatial relationship includes at least one parameter of a geometric transformation between the at least first and second sequences of representations.

Preferably, the spatial relationship includes a 2-dimensional projective transformation.

Alternatively, the spatial relationship includes a 3-dimensional projective transformation.

Further in accordance with a preferred embodiment of the present invention the spatial relationship includes a fundamental matrix.

Still further in accordance with a preferred embodiment of the present invention the spatial relationship includes a 2-dimensional parametric transformation.

Additionally in accordance with a preferred embodiment of the present invention the spatial relationship includes an at least 3-dimensional parametric transformation.

Further in accordance with a preferred embodiment of the present invention the spatial relationship includes a 2-dimensional non-parametric transformation.

Additionally or alternatively, the spatial relationship includes an at least 3-dimensional non-parametric transformation.

Further in accordance with a preferred embodiment of the present invention the spatial relationship includes a spatial relationship between individual ones of the representations belonging to different ones of the at least first and second sequences.

Still further in accordance with a preferred embodiment of the present invention the spatial relationship includes a spatial relationship between individual ones of the representations belonging to different ones of the at least first and second sequences, at least one of the individual ones of the representations being an interpolated representation.

Additionally in accordance with a preferred embodiment of the present invention the spatial relationship includes a spatial relationship between individual ones of the representations belonging to different ones of the at least first and second sequences, one of the individual ones of the representations being an interpolated representation and the other of the individual ones of the representations being a non-interpolated representation.

Further in accordance with a preferred embodiment of the present invention the temporal relationship includes at least one parameter of a temporal transformation between the at least first and second sequences of representations.

Still further in accordance with a preferred embodiment of the present invention the temporal relationship includes a time shift between the at least first and second sequences of representations.

Preferably, the temporal relationship includes an affine transformation in time, a parametric transformation in time and/or a non-parametric transformation in time.

Further in accordance with a preferred embodiment of the present invention the temporal relationship includes a temporal relationship in time between individual ones of the representations belonging to different ones of the at least first and second sequences.

Still further in accordance with a preferred embodiment of the present invention the temporal relationship includes a temporal relationship in time between individual ones of the representations belonging to different ones of the at least first and second sequences, at least one of the individual ones of the representations being an interpolated representation.

Additionally in accordance with a preferred embodiment of the present invention the temporal relationship includes a temporal relationship in time between individual ones of the representations belonging to different ones of the at least first and second sequences. Typically, one of the individual ones of the representations is an interpolated representation and the other of the individual ones of the representations is a non-interpolated representation.

Preferably, the interpolated representation is interpolated in time and the interpolated representation is interpolated in space.

Further in accordance with a preferred embodiment of the present invention the first and second temporal progressions include ordered intra-sequence representation-to-representation transformations.

Still further in accordance with a preferred embodiment of the present invention the first and second temporal progressions include ordered intra-sequence representation-to-representation transformations resulting from relative motion between sensors and a scene.

Preferably, the intra-sequence representation-to-representation transformations include 2-dimensional projective transformations and/or 3-dimensional projective transformations.

Further in accordance with a preferred embodiment of the present invention the intra-sequence representation-to-representation transformations include fundamental matrices, 2-dimensional parametric transformations, at least 3-dimensional parametric transformations, 2-dimensional non-parametric transformations, at least 3-dimensional non-parametric transformations and camera matrices.

Still further in accordance with a preferred embodiment of the present invention the step of employing includes correlating the first and second temporal progressions.

Additionally in accordance with a preferred embodiment of the present invention the step of employing includes equating properties of the first temporal progression and the second temporal progression.

Further in accordance with a preferred embodiment of the present invention the step of employing includes correlating properties of the first temporal progression and the second temporal progression.

Still further in accordance with a preferred embodiment of the present invention the step of employing includes equating a sequential application and at least one of the intra-sequence representation-to-representation transformations of the first temporal progression and an unknown the spatial relationship between the at least first and second sequences with a sequential application of the unknown spatial relationship between the at least first and second sequences and at least one of the intra-sequence representation-to-representation transformations of the second temporal progression.

Further in accordance with a preferred embodiment of the present invention the step of employing includes equating a composition and at least one of the intra-sequence representation-to-representation transformations of the first temporal progression and an unknown the spatial relationship between the at least first and second sequences with a composition of the unknown spatial relationship between the at least first and second sequences and at least one of the intra-sequence representation-to-representation transformations of the second temporal progression.

Additionally in accordance with a preferred embodiment of the present invention the step of employing includes obtaining an unknown the spatial relationship between the at least first and second sequences by equating a sequential application and at least one of the intra-sequence representation-to-representation transformations of the first temporal progression and the unknown spatial relationship between the at least first and second sequences with a sequential application of the unknown spatial relationship between the at least first and second sequences and at least one of the intra-sequence representation-to-representation transformations of the second temporal progression.

Additionally in accordance with a preferred embodiment of the present invention the step of equating includes equating up to a scale factor.

Further in accordance with a preferred embodiment of the present invention the intra-sequence representation-to-representation transformations include multiple simple motions taking place at least partially at different times.

Preferably, the intra-sequence representation-to-representation transformations include multiple combinations of multiple simple motions taking place at least partially at different times.

Preferably, the intra-sequence representation-to-representation transformations include multiple complex motions taking place at least partially at different times.

Preferably, the intra-sequence representation-to-representation transformations include multiple combinations of multiple complex motions taking place at least partially at different times.

Further in accordance with a preferred embodiment of the present invention the first and second temporal progressions include ordered intra-sequence representation-to-representation transformations at least some of which result from relative motion between sensors and a scene.

Still further in accordance with a preferred embodiment of the present invention the step of employing uses multiple combinations of intra-sequence representation-to-representation transformations.

Further in accordance with a preferred embodiment of the present invention the spatial relationship between the at least first and second sequences of representations results from an acquisition relationship, between first and second sensors acquiring respective the at least first and second sequences, being fixed over time.

Still further in accordance with a preferred embodiment of the present invention the spatial relationship between the at least first and second sequences of representations results from an acquisition relationship, between first and second sensors acquiring respective the at least first and second sequences, changes in a known way over time.

Preferably, the acquisition relationship includes relative position, relative orientation and relative internal sensor parameters.

Further in accordance with a preferred embodiment of the present invention the acquisition relationship is known.

Alternatively, the acquisition relationship is not known.

Additionally in accordance with a preferred embodiment of the present invention the at least first and second sequences are acquired generally at the same time.

Preferably, the at least first and second sequences are acquired generally at different times.

Further in accordance with a preferred embodiment of the present invention the at least first and second sequences represent measurements from the same scene.

Additionally in accordance with a preferred embodiment of the present invention the at least first and second sequences represent measurements from different portions of the same scene.

Additionally or alternatively, the at least first and second sequences represent measurements from different overlapping portions of the same scene.

Further in accordance with a preferred embodiment of the present invention the at least first and second sequences represent measurements from different non-overlapping portions of the same scene.

Still further in accordance with a preferred embodiment of the present invention the at least first and second sequences represent measurements from different scenes.

Alternatively, the scene is two-dimensional.

Preferably, the scene is at least three-dimensional.

Further in accordance with a preferred embodiment of the present invention the scene is static. Alternatively, the scene is dynamic.

Further in accordance with a preferred embodiment of the present invention the measurements are generally the same for each sensor.

Still further in accordance with a preferred embodiment of the present invention the measurements are generally different for each sensor.

Preferably, the measurements include at least one of illumination, heat, radiance, electromagnetic radiation, color, distance, density, sound and speed.

Further in accordance with a preferred embodiment of the present invention the method also includes the step of employing at least one of the spatial and temporal relationships for sequence fusion.

Additionally in accordance with a preferred embodiment of the present invention the method also includes step of employing at least one of the spatial and temporal relationships for alignment of sequences obtained at different zooms.

Still further in accordance with a preferred embodiment of the present invention the method also includes the step of employing at least one of the spatial and temporal relationships for surveillance.

Further in accordance with a preferred embodiment of the present invention the method also includes the step of employing at least one of the spatial and temporal relationships for generation of wide-screen movies from multiple at least partially non-overlapping narrow field of view movies.

Additionally in accordance with a preferred embodiment of the present invention the method also includes the step of employing at least one of the spatial and temporal relationships for image fusion.

Further in accordance with a preferred embodiment of the present invention the method also includes the step of employing at least one of the spatial and temporal relationships for integrating information contained in the at least first and second sequences.

Still further in accordance with a preferred embodiment of the present invention the method also includes the step of employing at least one of the spatial and temporal relationships for alignment of images obtained at different zooms.

Additionally in accordance with a preferred embodiment of the present invention the method also includes the step of employing at least one of the spatial and temporal relationships for comparing information contained in the at least first and second sequences.

Further in accordance with a preferred embodiment of the present invention the method also includes the step of employing at least one of the spatial and temporal relationships for finding differences between information contained in the at least first and second sequences.

Still further in accordance with a preferred embodiment of the present invention the method also includes the step of employing at least one of the spatial and temporal relationships for finding differences between information contained in the at least first and second sequences relating to the same scene at different times.

Additionally in accordance with a preferred embodiment of the present invention the method also includes the step of employing at least one of the spatial and temporal relationships for integrating information contained in the at least first and second sequences and thereby providing an information output which exceeds limitations of individual sensors.

Further in accordance with a preferred embodiment of the present invention the step of employing includes comparing properties of the first temporal progression and the second temporal progression.

Still further in accordance with a preferred embodiment of the present invention the computation functionality includes functionality for computing the first and second temporal progressions which are then employed to obtain at least one of the spatial and temporal relationships.

Additionally in accordance with a preferred embodiment of the present invention the system also includes temporal progression computation functionality for computing the first and second temporal progressions and supplying them to the input functionality.

BRIEF DESCRIPTION OF THE DRAWINGS AND APPENDICES

The present invention will be understood and appreciated more fully from the following detailed description, taken in conjunction with the drawings in which:

FIG. 1B illustrates inherent ambiguities in the relative spatial relationship of images in the sequences taken as shown in FIG. 1A;

FIG. 4C illustrates portions of two sequences of images taken as shown in FIG. 4A and the unknown temporal relationship between the sequences;

FIG. 5B illustrates the relationships between image to image transformations within two sequences, induced by motion of two cameras along an axis, the two cameras being arranged at 90 degrees with respect to each other, one of the cameras being aligned along the axis of motion;

FIG. 5C illustrates the relationships between image to image transformations within two sequences, induced by motion of two cameras along an axis, the two cameras being directed in the same direction perpendicular to the direction of motion but at different zooms;

Figure 6A:
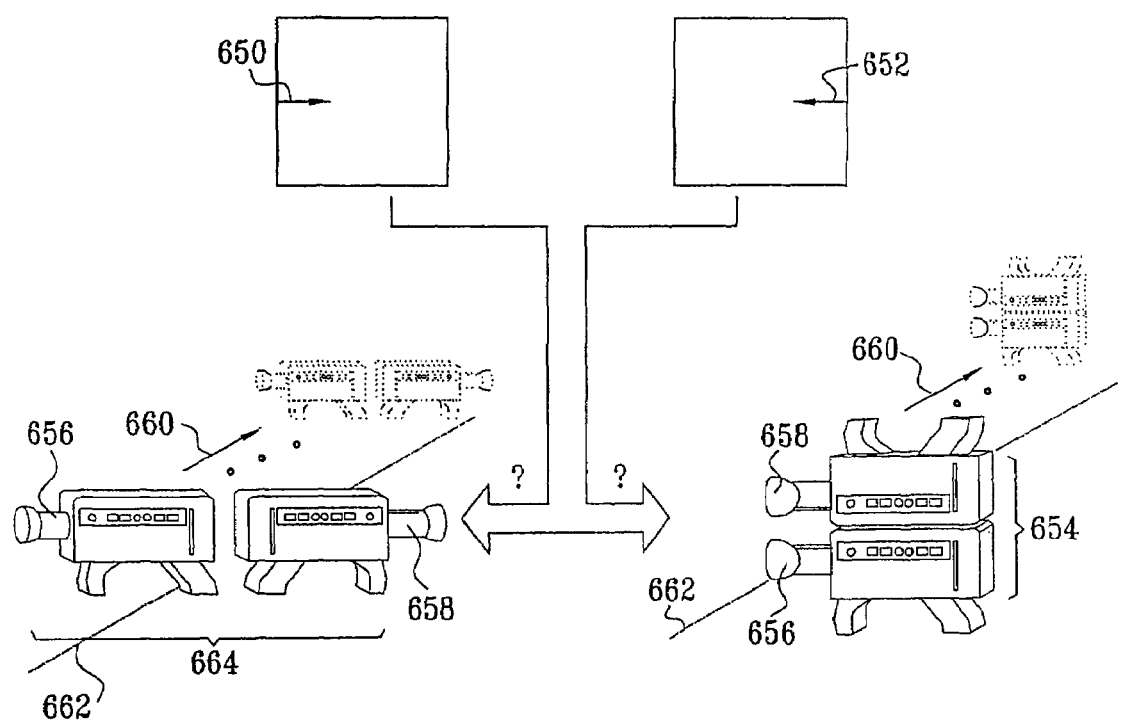
Figure 7:
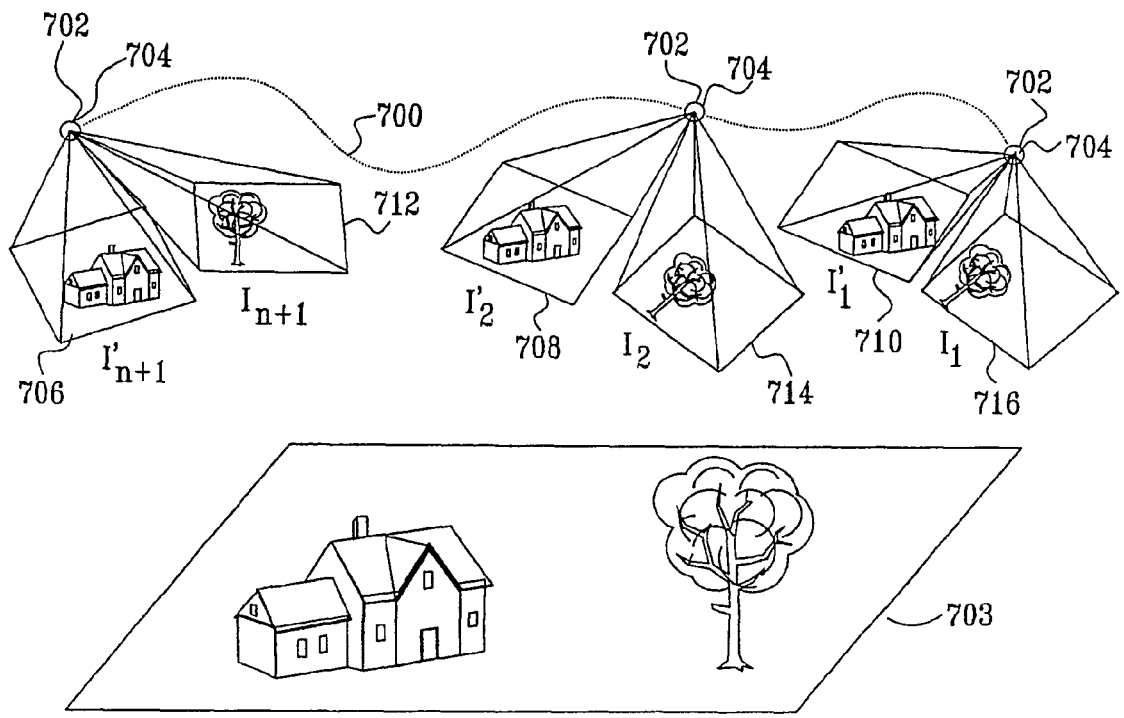
Figure 8:
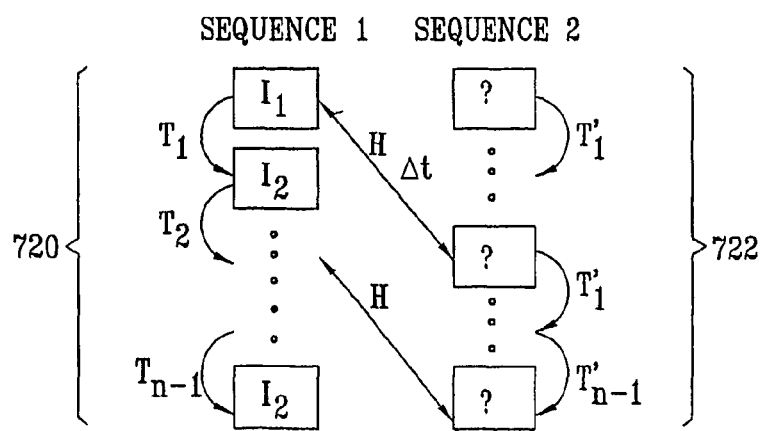

FIGS. 6A, 6B and 6C together illustrate that employing one type of transformation may not be sufficient for resolving ambiguities in the spatial and temporal relationships between sequences but that employing multiple different types of transformations reduces ambiguities in the spatial and temporal relationships between sequences;

FIG. 7 is a simplified illustration of a complex motion of two cameras, fixed to each other, each taking a sequence of images of a portion of a scene, the portions of the scene photographed by the two cameras being non-overlapping;

FIG. 8 is a simplified illustration portions of two sequences of images taken as shown in FIG. 7, wherein the two sequences are spatially related by a fixed and unknown inter-camera homography and temporally related by a fixed and unknown time shift.

Figure 9:
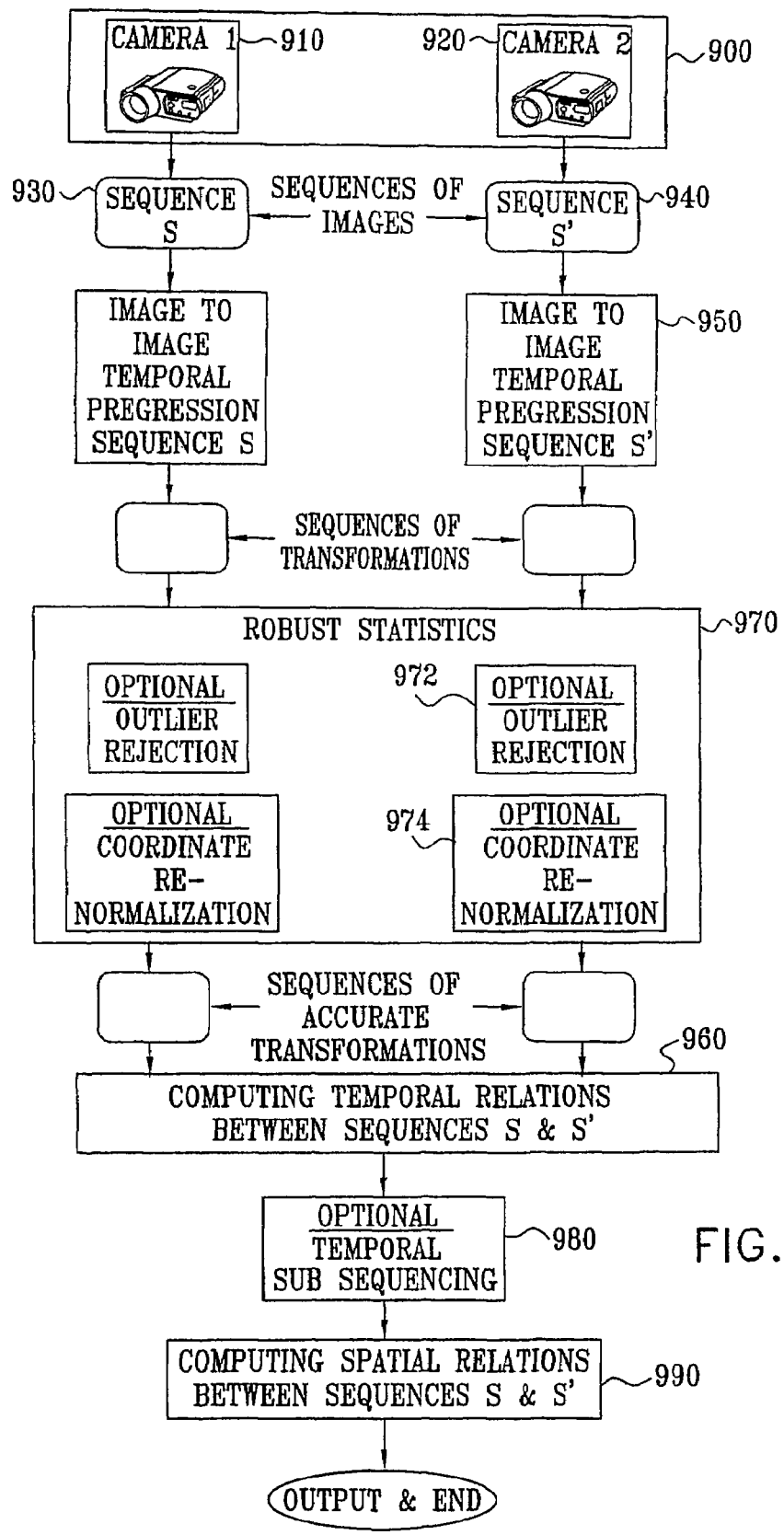

FIG. 9 is a simplified functional block diagram of a preferred process of creating two sequences of images and aligning them.

DETAILED DESCRIPTION OF PREFERRED EMBODIMENTS

Reference is now made to FIGS. 1A-1D which illustrate resolution of spatial and temporal relationships between sequences of images taken by two moving cameras fixed to each other in accordance with the present invention.

Figure 1A:
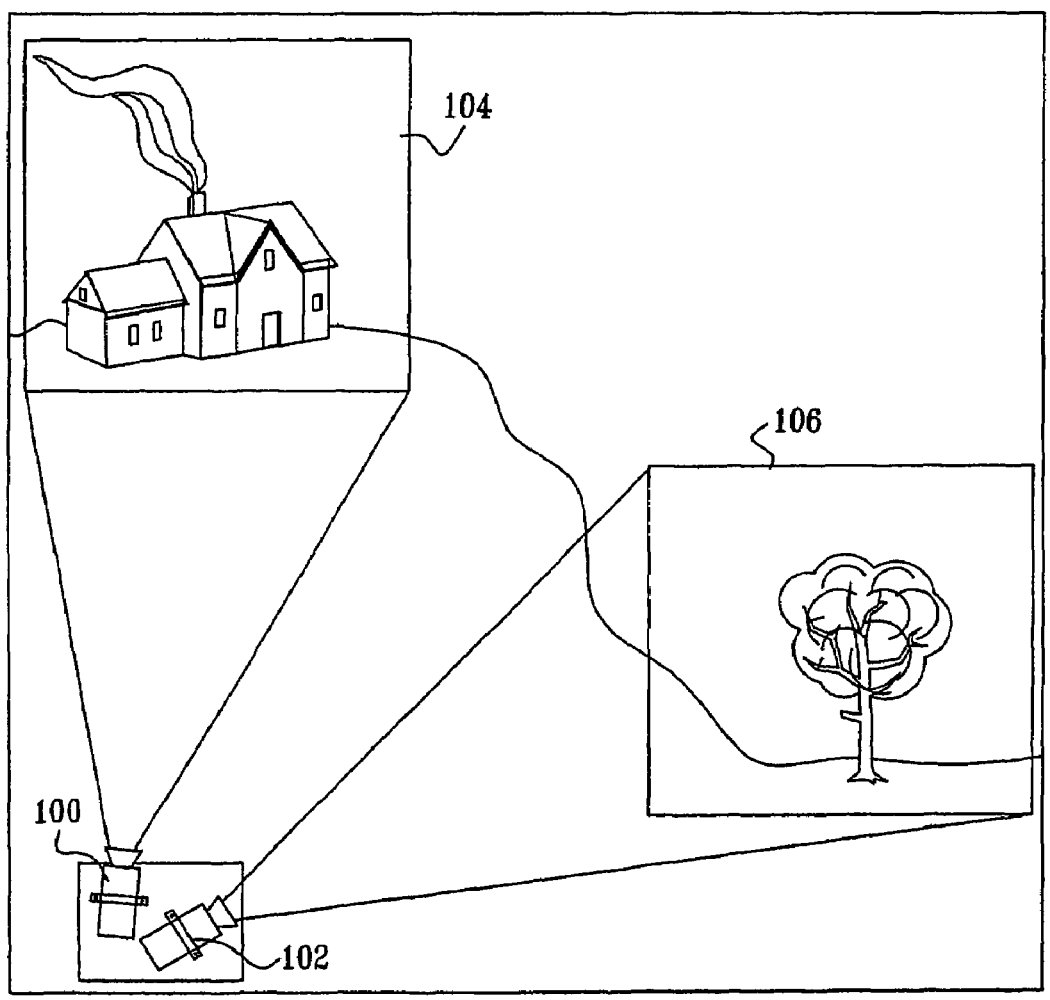
FIG. 1A is a simplified illustration of two cameras, fixed to each other, each taking a sequence of images of a portion of a scene, the portions of the scene photographed by the two cameras being non-overlapping.

As seen in FIG. 1A, two cameras, designated respectively by reference numerals 100 and 102 are fixed to each other in any suitable manner. Each camera takes a sequence of images of a portion of a scene as the cameras move while they are fixed together. The movement of the cameras may be any suitable movement, such as rotation and/or translation in one or more dimensions and relative to any suitable point. Thus, for example, the two cameras 100 and 102 may rotate about the optical axis of one of the cameras or about any other axis. Similarly, translation of the cameras may occur in any suitable direction.

In the present case (FIGS. 1A-1D) portions of the scene photographed by the two cameras are non-overlapping and are designated respectively by reference numerals 104 and 106.

Figure 1C:
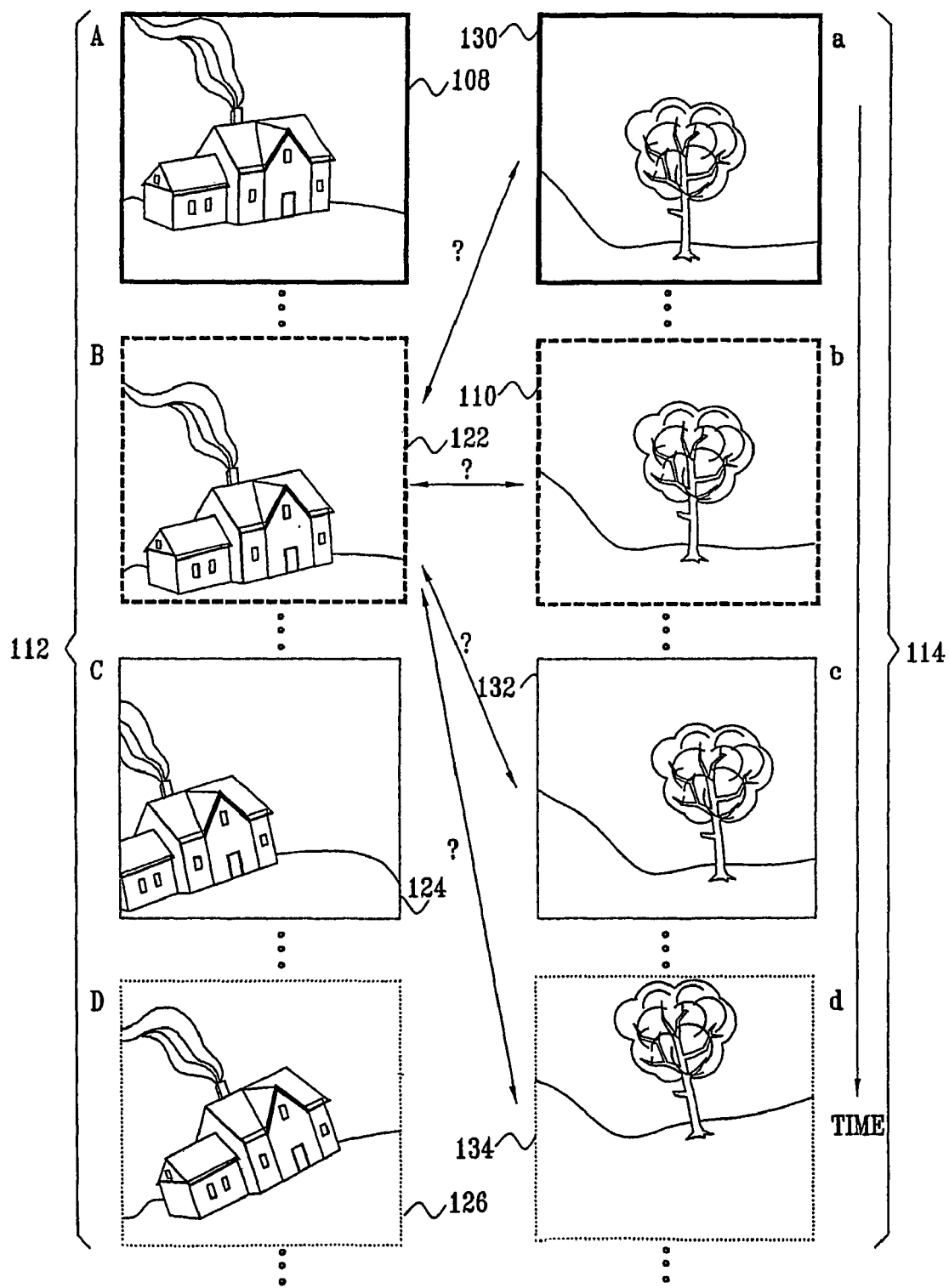
FIG. 1C illustrates portions of two sequences of images taken as shown in FIG. 1A and the unknown temporal relationship between the sequences.

Turning now to FIG. 1B, it is seen that the portions 104 and 106 of the scene of FIG. 1A may be represented by corresponding images 108 and 110. As seen in FIG. 1C, images 108 and 110 each belong to a sequence of images, each produced by one of the moving cameras 100 and 102, the respective sequences being designated by reference numerals 112 and 114. It is seen that sequence 112 also includes images 122, 124 and 126. Likewise, sequence 114 also includes images 130, 132 and 134.

A problem addressed by the present invention is that the visual information contained in individual pairs of images, one belonging to sequence 112 and the other belonging to sequence 114, (e.g. (108, 110), (122, 130) or (122, 134)), is sufficient to establish neither the spatial nor the temporal relationship between two images of a pair. More generally, the visual information contained in individual pairs of images, one of the pair belonging to sequence 112 and the other of the pair belonging to sequence 114, is sufficient to establish neither the spatial nor the temporal relationship between the two sequences 112 and 114.

In the context of FIGS. 1A-1D, two images are in the same "temporal relationship" if they are taken at the same time.

The unknown spatial relationship of images 108 and 110 is seen graphically by considering three examples of possible relative spatial relationships shown in FIG. 1B and designated by reference numerals 116, 118 and 120. In each example, the two images 108 and 110 are placed in a different spatial relationship, all of which are consistent with the visual content of the images 108 and 110.

The unknown temporal relationship of sequences 112 and 114 is seen graphically by considering FIG. 1C. It is appreciated that it is not apparent from a cursory examination of sequences 112 and 114, which images in sequence 112 are taken at the same time as which images in sequence 114.

Figure 1D:
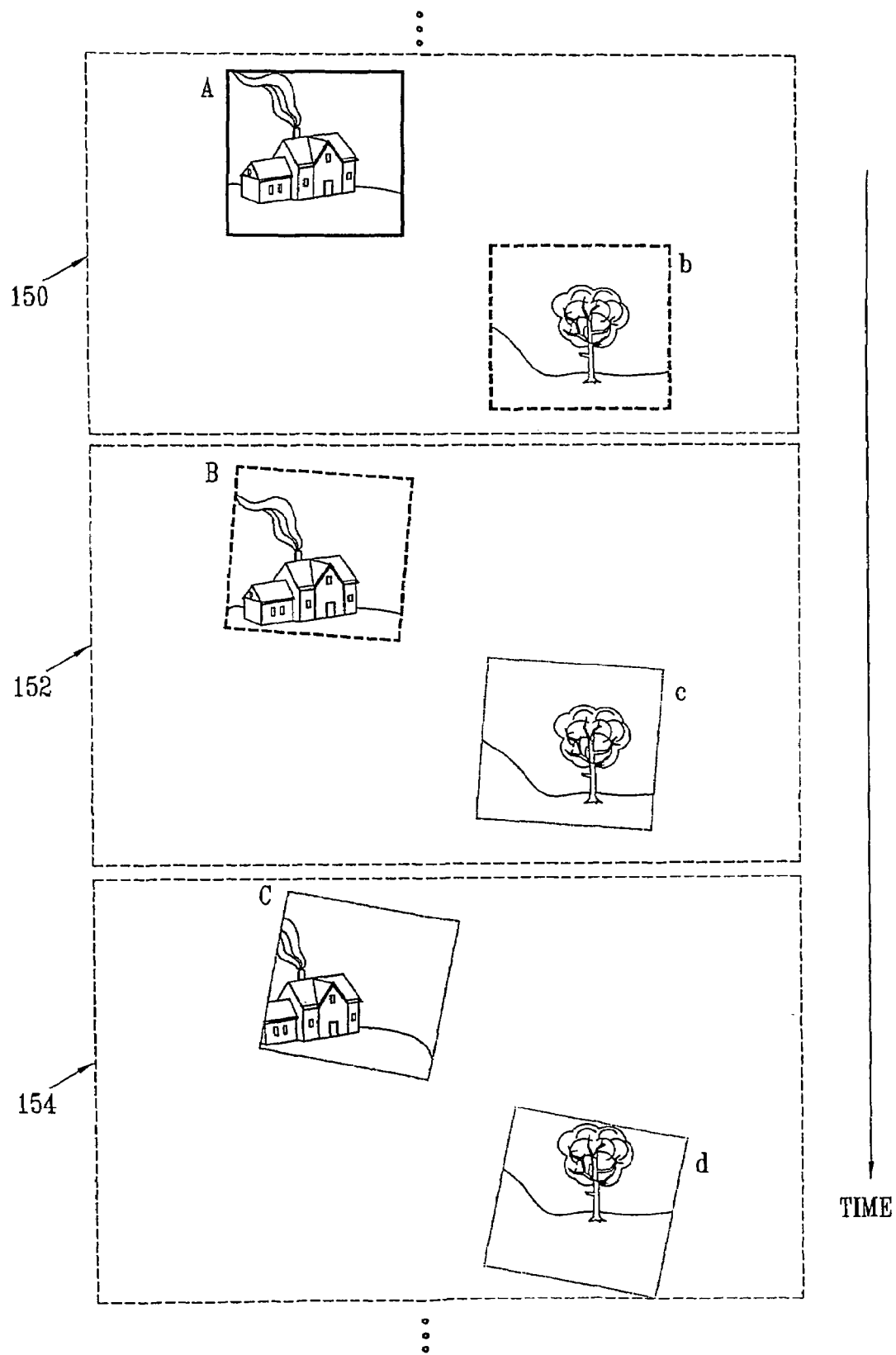
FIG. 1D illustrates pairs of images forming part of the sequences of images taken as shown in FIG. 1A, whose spatial and temporal relationships are determined in accordance with the present invention.

The present invention provides a system and technique for determining the correct relationship between the images 108 and 110 and more generally the correct spatial and temporal relationships between sequences 112 and 114, as shown in FIG. 1D. Thus, it may be appreciated that the present invention determines which image in sequence 112 corresponds in time with which image in sequence 114 and further determines the spatial relationship between the images which correspond in time.

Thus it is seen in FIG. 1D that image A (108) in sequence 112 is found to correspond in time with image b (110) in sequence 114. The correct spatial relationship between images A (108) and b (110) is shown in FIG. 1D at reference numeral 150. Similarly, image B (122) in sequence 112 is found to correspond in time with image c (132) in sequence 114 and image C (124) in sequence 112 is found to correspond in time with image d (134) in sequence 114. The correct spatial relationship between images B (122) and c (132) is shown in FIG. 1D at reference numeral 152 and the correct spatial relationship between images C (124) and d (134) is shown in FIG. 1D at reference numeral 154.

The present invention employs an appreciation that despite there being no common static visual information in the two sequences, the image to image dynamics in each of the two sequences are nevertheless related both spatially and temporally. The present invention utilizes the relationship between the dynamics to correlate the two sequences in time and space.

As will be described hereinbelow in detail, the image to image dynamics preferably are expressed by spatial transformations over time between images in each sequence. The problem of aligning sequences of images in time and space is thus reduced to a problem of determining the relationship between sequences of such transformations in time and in space.

It is appreciated from a consideration of FIG. 1D, that by employing the present invention aligned sequences may be realized, which sequences may then be utilized to localize two portions of a scene with respect to each other, despite the absence of spatial overlap therebetween.

Reference is now made to FIGS. 2A-2D which illustrate the resolution of spatial and temporal relationships between sequences of images taken by two moving cameras fixed to each other in accordance with the present invention, the portions of the scene being photographed at significantly different zooms by the two cameras.

Figure 2A:
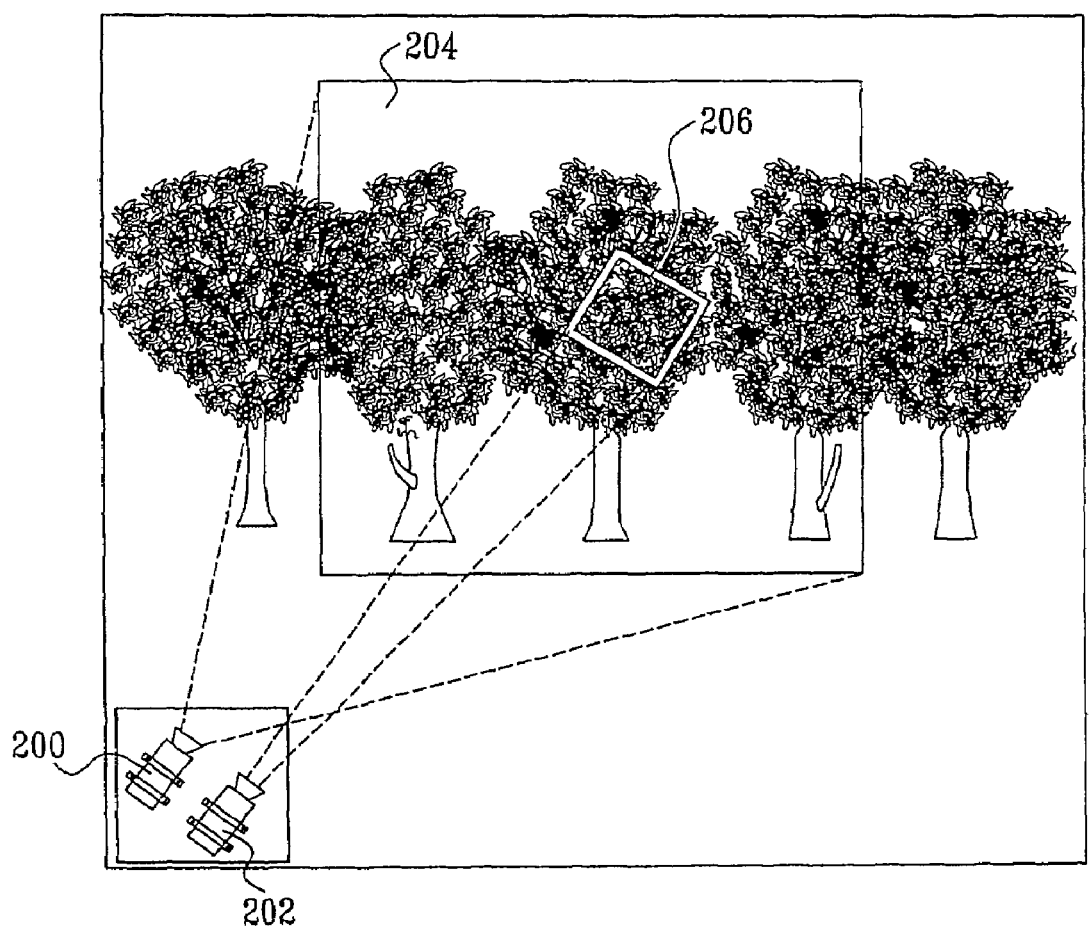
FIG. 2A is a simplified illustration of two cameras, fixed to each other, each taking a sequence of images of a portion of a scene, the portions of the scene being photographed at significantly different zooms by the two cameras.

As seen in FIG. 2A, two cameras, designated respectively by reference numerals 200 and 202 are fixed to each other in any suitable manner. Each camera takes a sequence of images of a portion of a scene as the cameras move while they are fixed together. The movement of the cameras may be any suitable movement, such as rotation and/or translation in one or more dimensions and relative to any suitable point. Thus, for example, the two cameras may rotate about the optical axis of one of the cameras or about any other axis. Similarly, translation of the cameras may occur in any suitable direction.

In the present case (FIGS. 2A-2D) portions of the scene photographed by the two cameras are imaged at significantly different zooms, thus imaging various features in the scene at different spatial scales. Two portions of the scene, which need not necessarily be overlapping, are designated respectively by reference numerals 204 and 206.

Figure 2B:
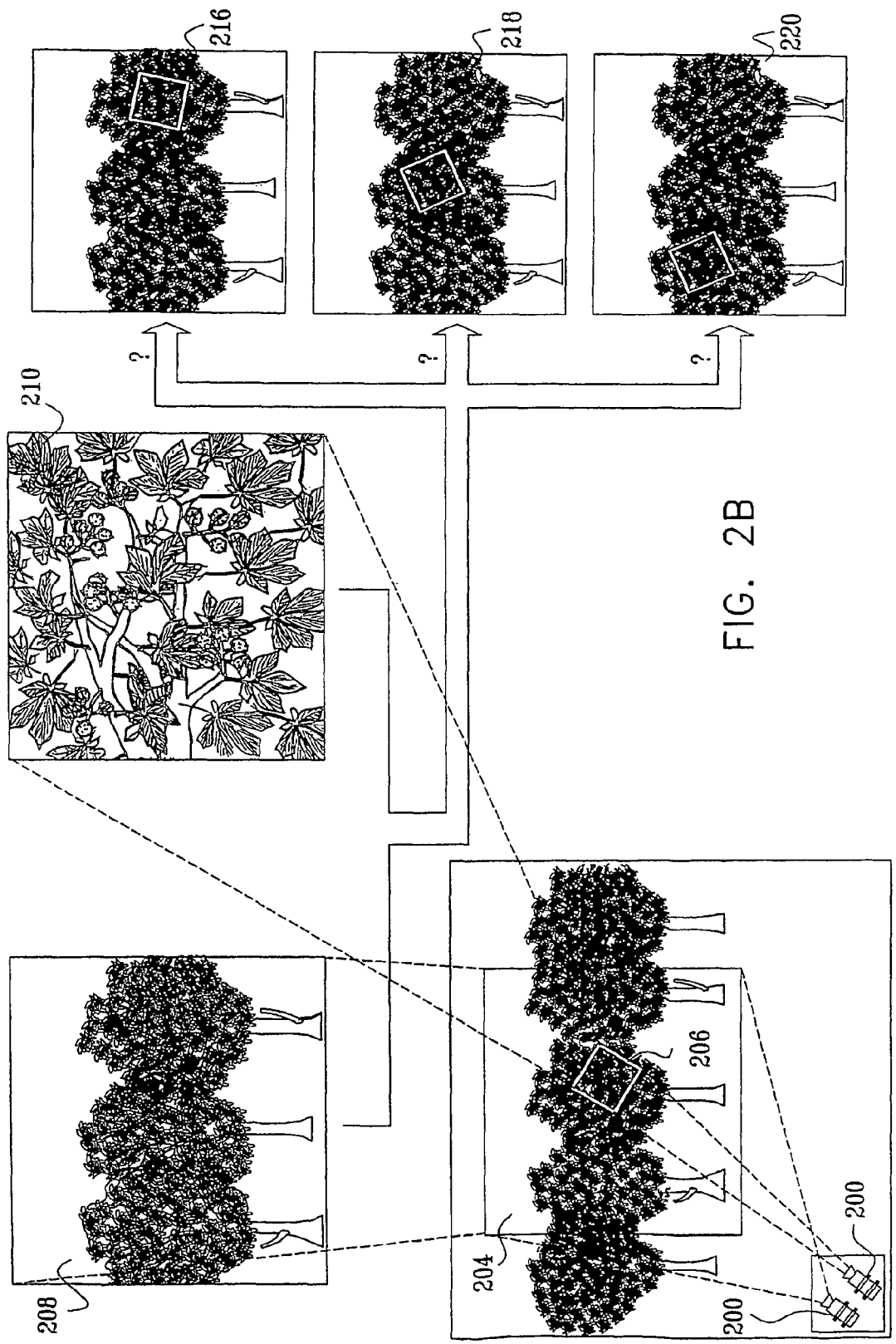
FIG. 2B illustrates inherent ambiguities in the relative spatial relationship of images in the sequences taken as shown in FIG. 2A.
Figure 2C:
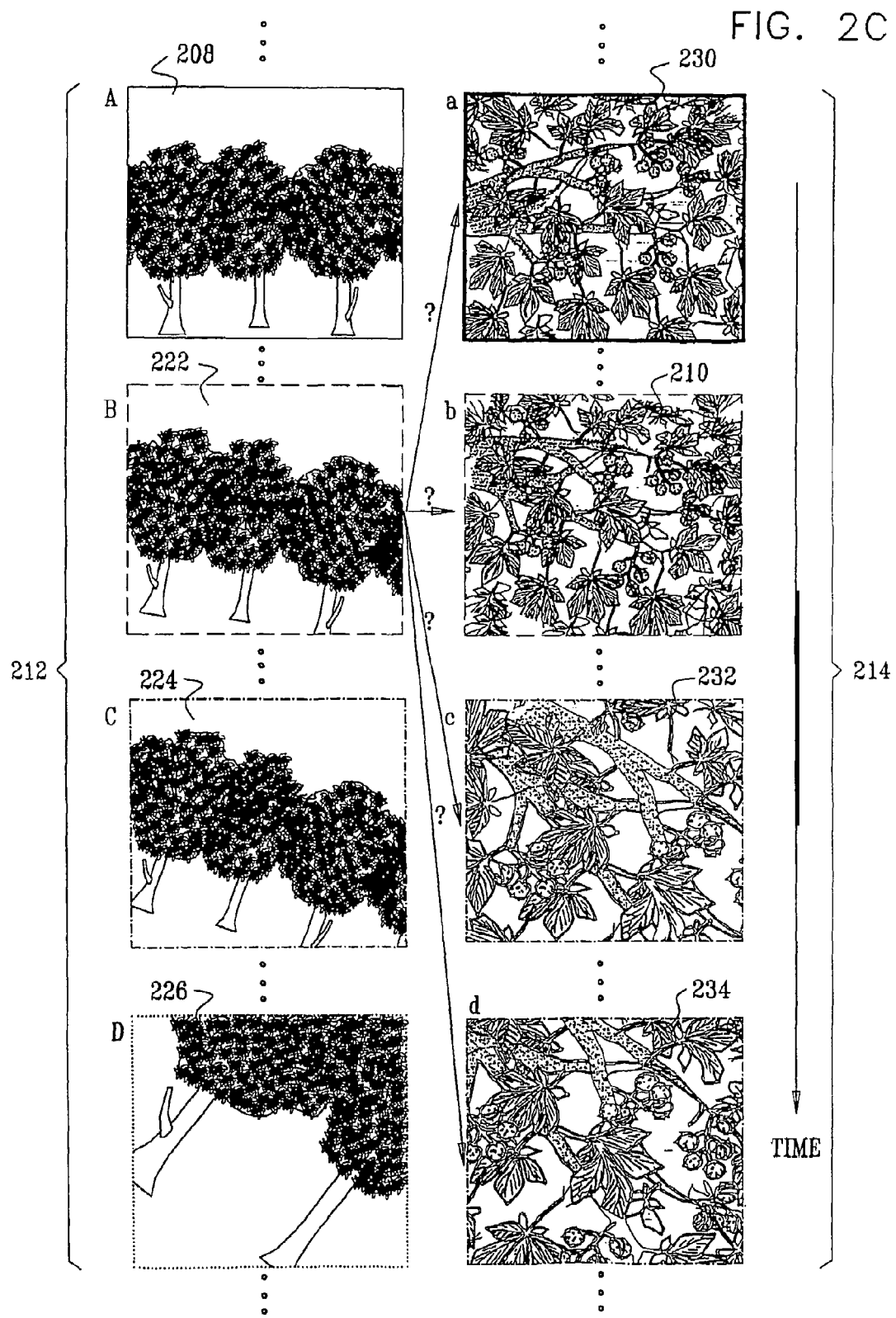
FIG. 2C illustrates portions of two sequences of images taken as shown in FIG. 2A and the unknown temporal relationship between the sequences.

Turning now to FIG. 2B, it is seen that the portions 204 and 206 of the scene of FIG. 2A may be represented by corresponding images 208 and 210, respectively. As seen in FIG. 2C, images 208 and 210 each belong to a sequence of images, each produced by one of the moving cameras 200 and 202, the respective sequences being designated by reference numerals 212 and 214. It is seen that sequence 212 also includes images 222, 224 and 226. Likewise, sequence 214 also includes images 230, 232 and 234.

It is appreciated that features imaged in the zoomed-in image 210 may be different from the features imaged in the zoomed-out image 208 due to the different spatial scales employed by the cameras. Thus, for example, individual leaves of a tree may be discerned in image 210, while such leaves may not be discernible in image 208. Similarly trees may be discerned in image 208, while only leaves and branches are discernible in image 210.

A problem addressed by the present invention is that the visual information contained in individual pairs of images, one belonging to sequence 212 and the other belonging to sequence 214, (e.g. (208, 210), (222, 230) or (222, 234)), is sufficient to establish neither the spatial nor the temporal relationship between two images of a pair. More generally, the visual information contained in individual pairs of images, one of the pair belonging to sequence 212 and the other of the pair belonging to sequence 214, is sufficient to establish neither the spatial nor the temporal relationship between the two sequences 212 and 214.

In the context of FIGS. 2A-2D, two images are in the same "temporal relationship" if they are taken at the same time.

The unknown spatial relationship of images 208 and 210 is seen graphically by considering three examples of possible relative spatial relationships shown in FIG. 2B and designated by reference numerals 216, 218 and 220. In each example, the two images 208 and 210 are placed in a different spatial relationship with each other, all of which are consistent with the visual content of the images 208 and 210.

The unknown temporal relationship of sequences 212 and 214 is seen graphically by considering FIG. 2C. It is appreciated that it is not apparent from a cursory examination of sequences 212 and 214, which images in sequence 212 are taken at the same time as which images in sequence 214.

Figure 2D:
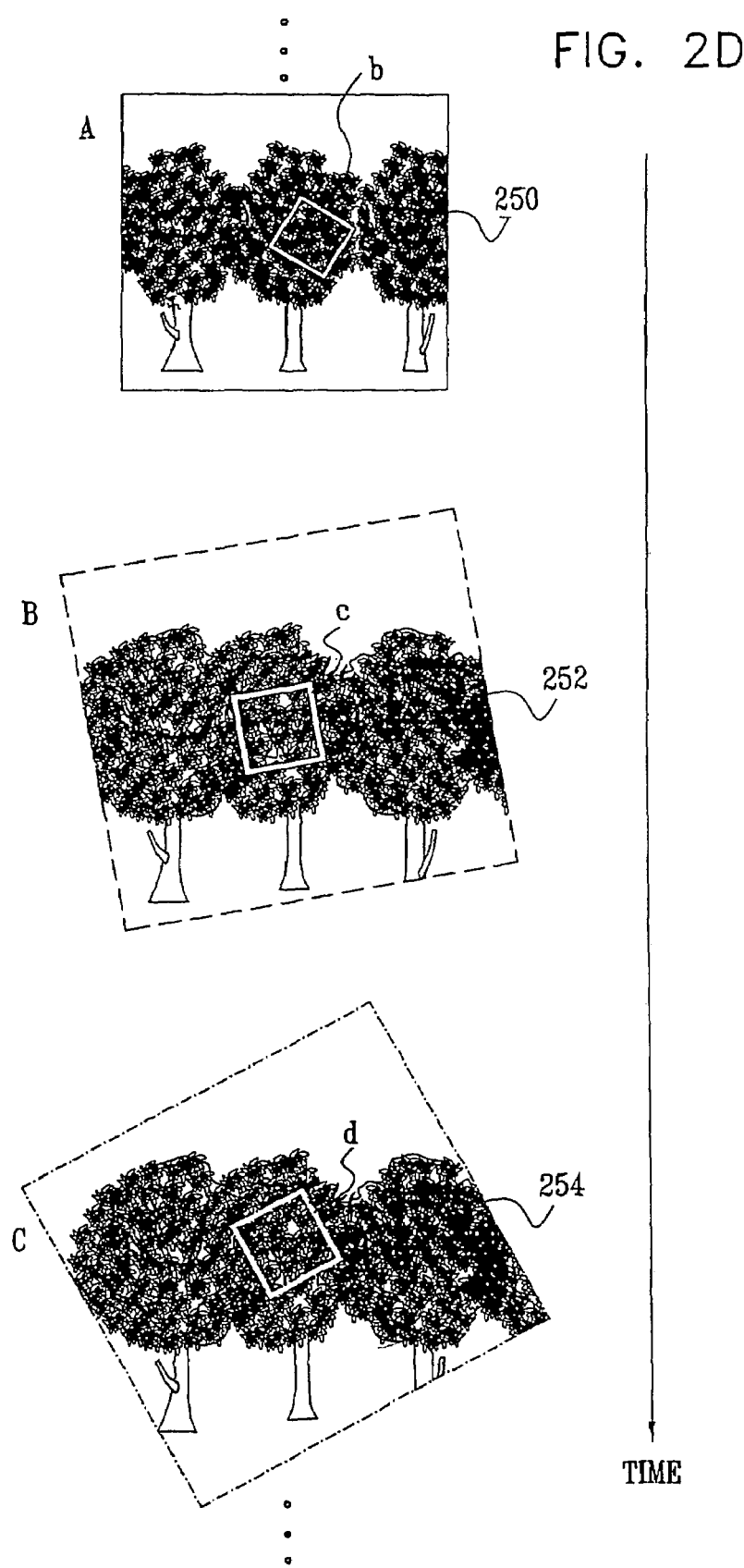
FIG. 2D illustrates pairs of images forming part of the sequences of images taken as shown in FIG. 2A, whose spatial and temporal relationships are determined in accordance with the present invention.

The present invention provides a system and technique for determining the correct relationship between the images 208 and 210 and more generally the correct spatial and temporal relationships between sequences 212 and 214, as shown in FIG. 2D. Thus, it may be appreciated that the present invention determines which image in sequence 212 corresponds in time with which image in sequence 214 and further determines the spatial relationship between the images which correspond in time.

Thus it is seen in FIG. 2D that image A (208) in sequence 212 is found to correspond in time with image b (210) in sequence 214. The correct spatial relationship between images A (208) and b (210) is shown in FIG. 2D at reference numeral 250. Similarly, image B (222) in sequence 212 is found to correspond in time with image c (232) in sequence 214 and image C (224) in sequence 212 is found to correspond in time with image d (234) in sequence 214. The correct spatial relationship between images B (222) and c (232) is shown in FIG. 2D at reference numeral 252 and the correct spatial relationship between images C (224) and d (234) is shown in FIG. 2D at reference numeral 254.

The present invention employs an appreciation that despite there not necessarily being any common static visual information in the two sequences, the image to image dynamics in each of the two sequences are nevertheless related both spatially and temporally. The present invention utilizes the relationship between the dynamics to correlate the two sequences in time and space.

As will be described hereinbelow in detail, the image to image dynamics preferably are expressed by spatial transformations over time between images in each sequence. The problem of aligning sequences of images in time and space is thus reduced to a problem of determining the relationship between sequences of such transformations in time and in space.

It is appreciated from a consideration of FIG. 2D, that by employing the present invention aligned sequences may be realized, which sequences may then be utilized to provide high resolution details of a portion of a scene, localized with respect to a zoomed-out view of the scene, providing a wide field of view context.

Reference is now made to FIGS. 3A-3D which illustrate resolution of spatial and temporal relationships between sequences of images taken by two moving sensors fixed to each other in accordance with the present invention, the portions of the scene being imaged by the two sensors employing different sensing modalities.

Figure 3A:
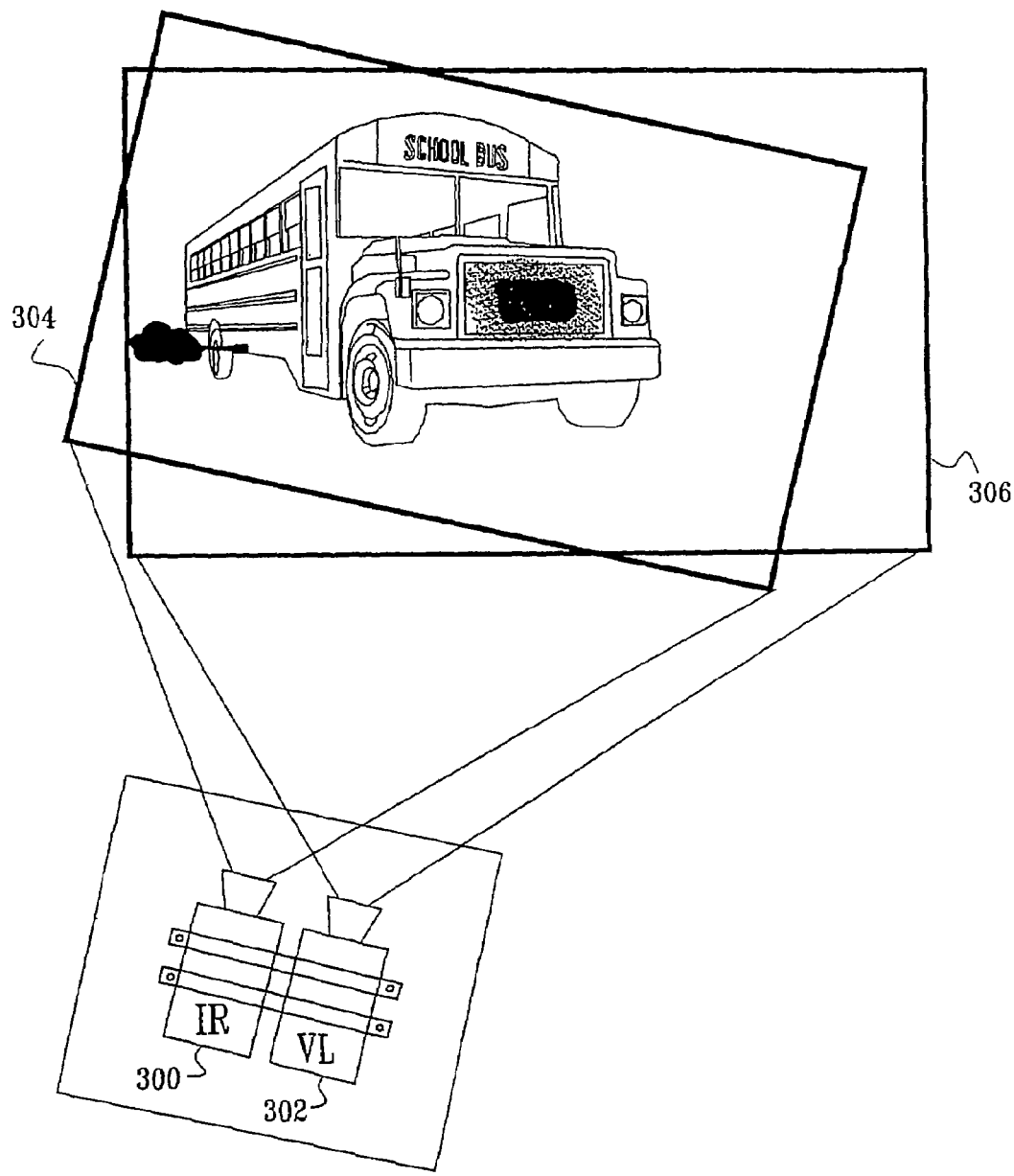
FIG. 3A is a simplified illustration of two sensors, fixed to each other, each taking a sequence of images of a portion of a scene, the portions of the scene being imaged by the two sensors employing different sensing modalities.

As seen in FIG. 3A, two sensors, such as an infra red (IR) camera 300 and a visible light (VL) camera 302, are fixed to each other in any suitable manner. Each sensor takes a sequence of images of a portion of a scene as the sensors move while they are fixed together. The movement of the sensors may be any suitable movement, such as rotation and/or translation in one or more dimensions and relative to any suitable point. Thus, for example, the two sensors may rotate about the optical axis of one of the sensors or about any other axis. Similarly, translation of the sensors may occur in any suitable direction.

In the present case (FIGS. 3A-3D) portions of the scene sensed by the two sensors are imaged at different wavelength ranges, thus imaging various features in the scene in different modalities. Two portions of the scene, which need not necessarily be overlapping or at the same zoom, are designated by reference numerals 304 and 306.

Figure 3B:
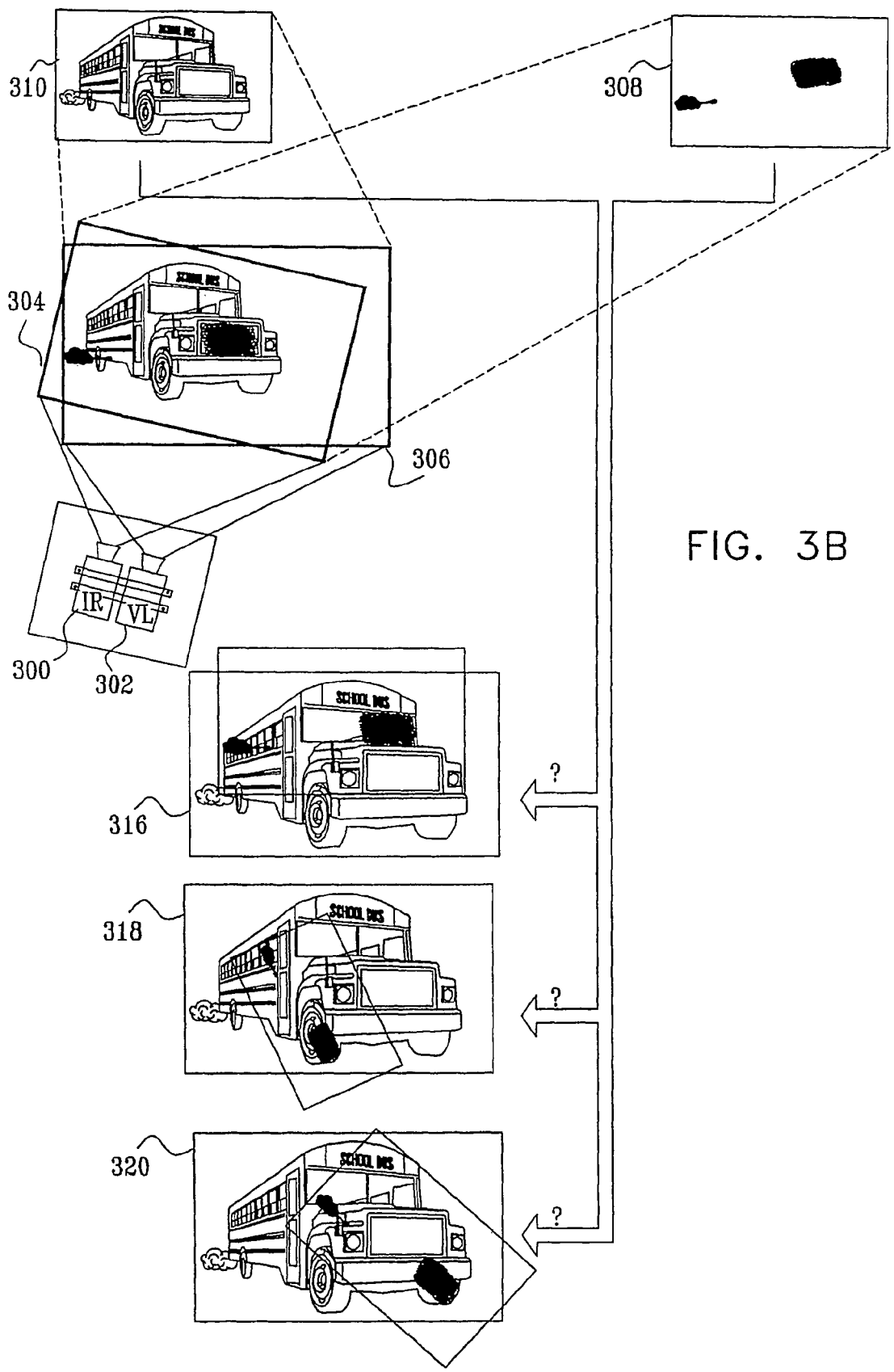
FIG. 3B illustrates inherent ambiguities in the relative spatial relationship of images in the sequences taken as shown in FIG. 3A.
Figure 3C:
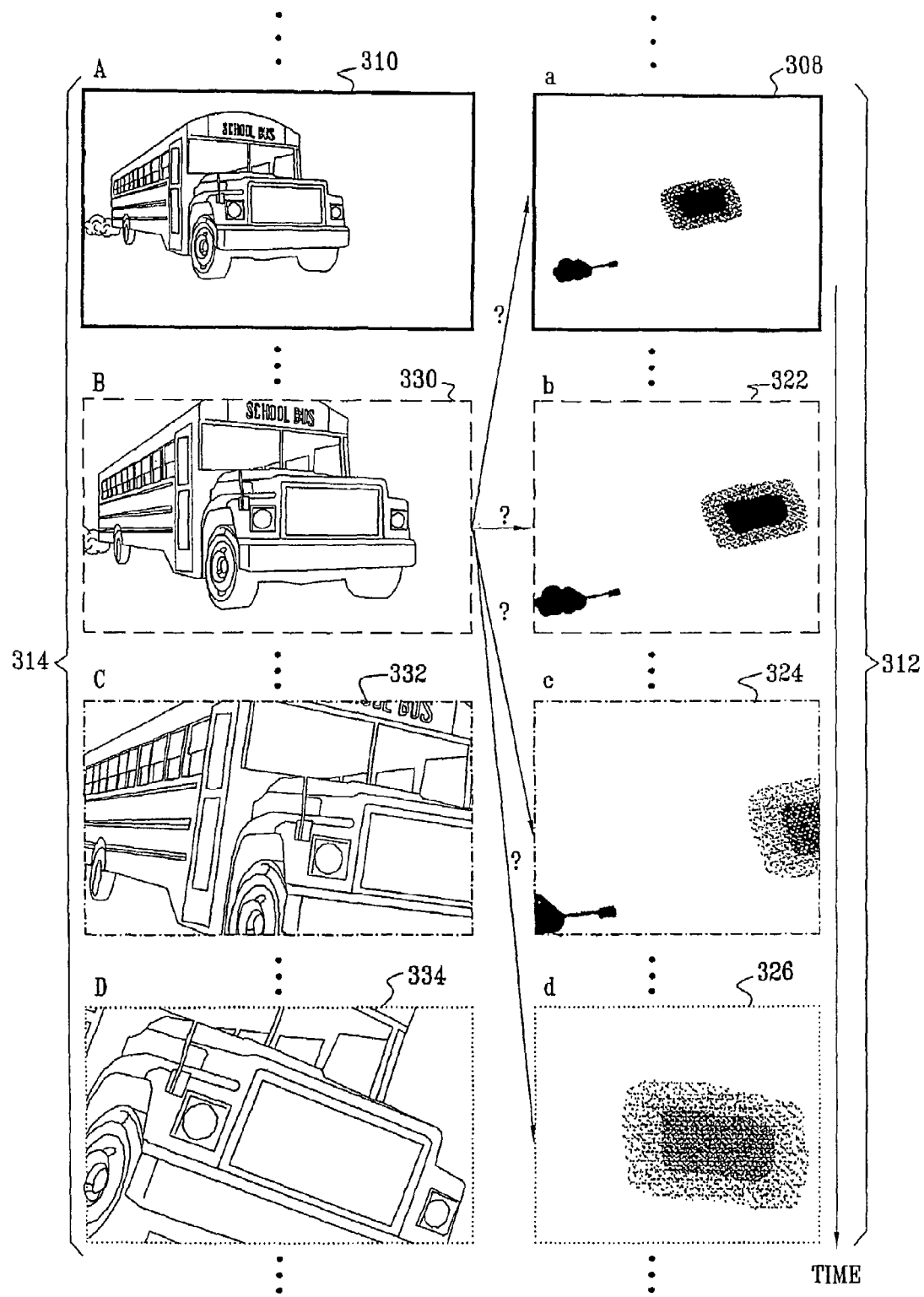
FIG. 3C illustrates portions of two sequences of images taken as shown in FIG. 3A and the unknown temporal relationship between the sequences.

Turning now to FIG. 3B, it is seen that the portions 304 and 306 of the scene of FIG. 3A may be represented by corresponding images 308 and 310. As seen in FIG. 3C, images 308 and 310 each belong to a sequence of images, each produced by one of the moving sensors 300 and 302, the respective sequences being designated by reference numerals 312 and 314. It is seen that sequence 312 also includes images 322, 324 and 326. Likewise, sequence 314 also includes images 330, 332 and 334.

It is appreciated that features imaged in the infra-red (IR) image 308 may be different from the features imaged in the visible light (VL) image 310 due to the different sensing modalities employed by the sensors. Thus, for example, hot regions may be discerned in image 308, while heat is not sensed in image 310. Similarly the visual appearance of a bus may be discerned in image 310, while features appearing only in visible light are not captured in image 308.

A problem addressed by the present invention is that the visual information contained in individual pairs of images, one belonging to sequence 312 and the other belonging to sequence 314, (e.g. (308, 310), (322, 330) or (322, 334)), is sufficient to establish neither the spatial nor the temporal relationship between two images of a pair. More generally, the visual information contained in individual pairs of images, one of the pair belonging to sequence 312 and the other of the pair belonging to sequence 314, is sufficient to establish neither the spatial nor the temporal relationship between the two sequences 312 and 314.

In the context of FIGS. 3A-3D, two images are in the same "temporal relationship" if they are taken at the same time.

The unknown spatial relationship of images 308 and 310 is seen graphically by considering three examples of possible relative spatial relationships shown in FIG. 3B and designated by reference numerals 316, 318 and 320. In each example, the two images 308 and 310 are placed in a different spatial relationship, all of which are consistent with the visual content of the images 308 and 310.

The unknown temporal relationship of sequences 312 and 314 is seen graphically by considering FIG. 3C. It is appreciated that it is not apparent from a cursory examination of sequences 312 and 314, which images in sequence 312 are taken at the same time as which images in sequence 314.

Figure 3D:
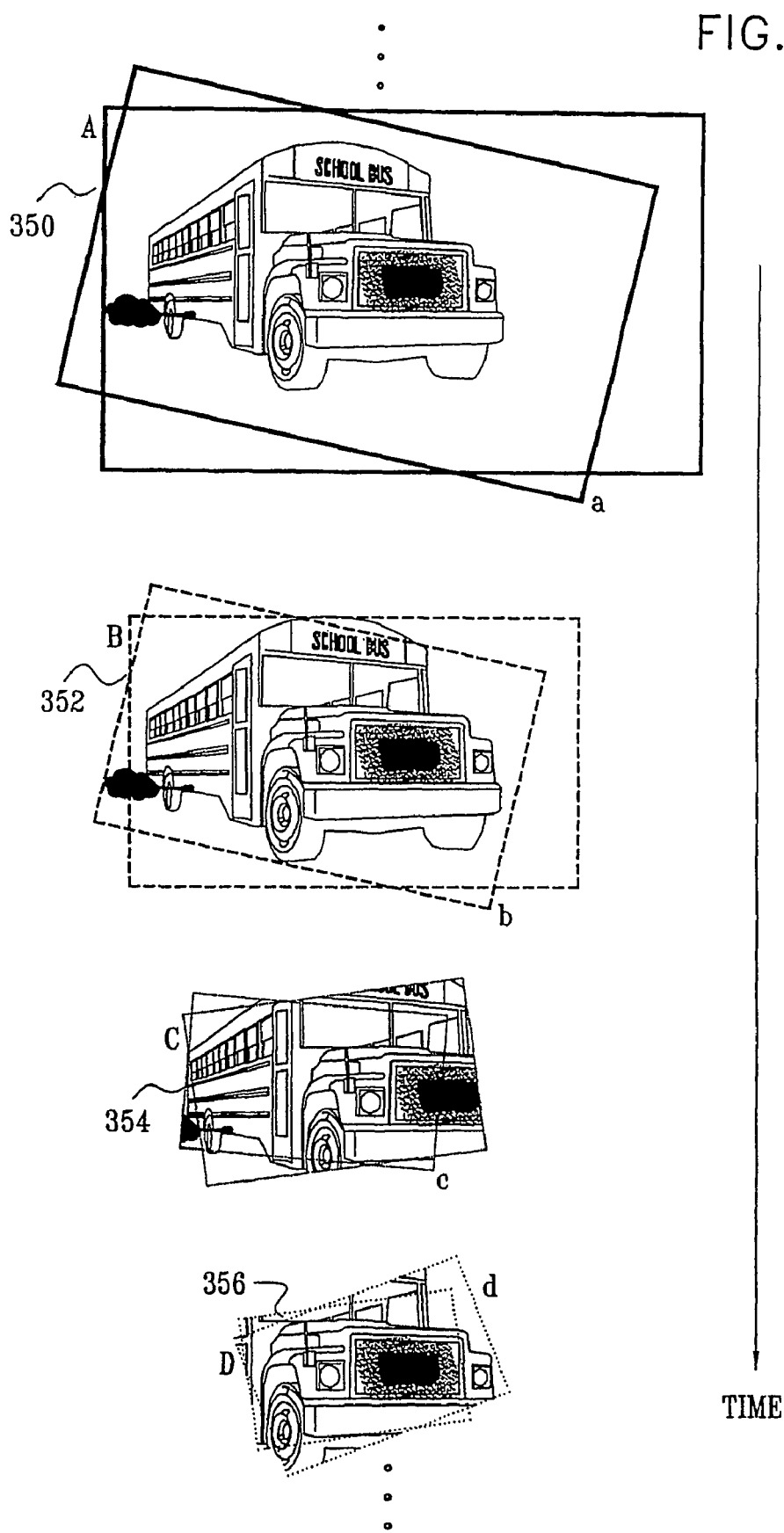
FIG. 3D illustrates pairs of images forming part of the sequences of images taken as shown in FIG. 3A, whose spatial and temporal relationships are determined in accordance with the present invention.

The present invention provides a system and technique for determining the correct relationship between the images 308 and 310 and more generally the correct spatial and temporal relationships between sequences 312 and 314, as shown in FIG. 3D. Thus, it may be appreciated that the present invention determines which image in sequence 312 corresponds in time with which image in sequence 314 and further determines the spatial relationship between the images which correspond in time.

Thus it is seen in FIG. 3D that image A (310) in sequence 314 is found to correspond in time with image a (308) in sequence 312. The correct spatial relationship between images A (310) and a (308) is shown in FIG. 3D at reference numeral 350. Similarly, image B (330) in sequence 314 is found to correspond in time with image b (322) in sequence 312, image C (332) in sequence 314 is found to correspond in time with image c (324) in sequence 312 and image D (334) in sequence 314 is found to correspond in time with image d (326) in sequence 312. The correct spatial relationship between images B (330) and b (322) is shown in FIG. 3D at reference numeral 352, the correct spatial relationship between images C (332) and c (324) is shown in FIG. 3D at reference numeral 354 and the correct spatial relationship between images D (334) and d (326) is shown in FIG. 3D at reference numeral 356. Thus it may be realized that the hot regions captured in the IR image sequence 312 are in fact the radiator and the exhaust gases of the bus.

The present invention employs an appreciation that despite there not necessarily being any common static visual information in the two sequences, the image to image dynamics in each of the two sequences are nevertheless related both spatially and temporally. The present invention utilizes the relationship between the dynamics to correlate the two sequences in time and space, without requiring understanding or interpretation of the features captured by the sequences.

As will be described hereinbelow in detail, the image to image dynamics preferably are expressed by spatial transformations over time between images in each sequence. The problem of aligning sequences of images in time and space is thus reduced to a problem of determining the relationship between sequences of such transformations in time and in space.

It is appreciated from a consideration of FIG. 3D, that by employing the present invention aligned sequences may be realized, which sequences may then be integrated to provide a composite sequence displaying the totality of information captured by both sequences. In this example, the composite sequence thus captures information over a wavelength range which is beyond that of the individual sensors 300 and 302.

Reference is now made to FIGS. 4A-4D which illustrate resolution of spatial and temporal relationships between sequences of images of a scene taken at two different times, producing two corresponding sequences of images. A camera used for producing the sequences of images is fixed to a element which travels along a path that is generally identical for both sequences.

Figure 4A:
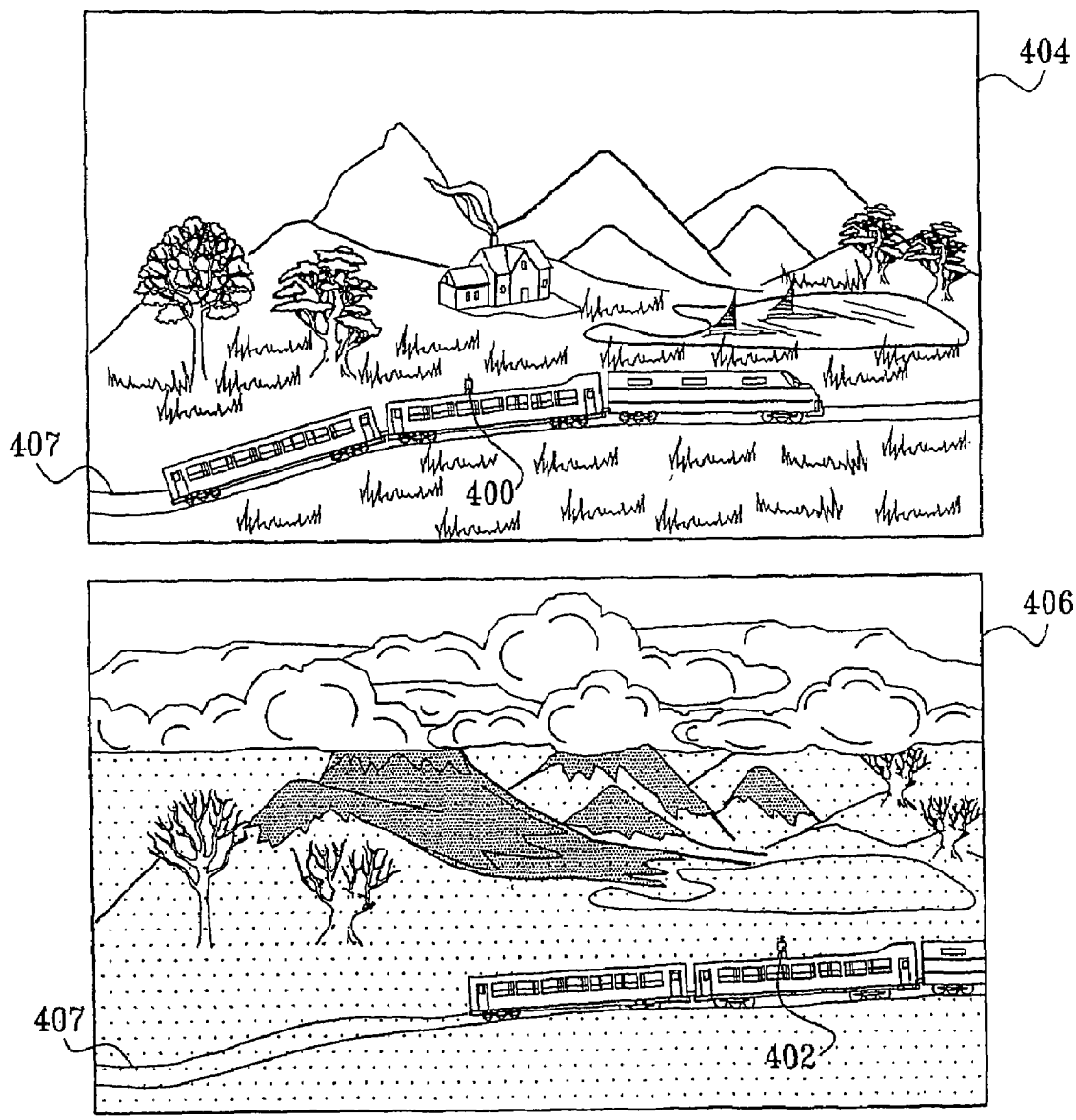
FIG. 4A is a simplified illustration of a scene being photographed at two different times, producing two corresponding sequences of images, the path traveled by a camera used for photographing being generally identical for both sequences.

As seen in FIG. 4A, a camera mounted onto an element, traveling along a generally identical path, such as a railroad track, images a scene at two different times, here typically summer and winter. The camera used in the summer is designated by reference numeral 400, while the camera used in the winter is designated by reference numeral 402, it being appreciated that the same camera or different cameras may be employed. The cameras may have the same or different settings.

Each camera takes a sequence of images of the scene. In this case the scene being imaged at the two different times, has two different appearances, as designated by reference numerals 404 and 406. Reference numeral 404 designates a view of a train bearing camera 400, traveling along railroad track 407 in the summer. Reference numeral 406 designates a view of a train bearing camera 402 traveling along railroad track 407 in the winter.

Figure 4B:
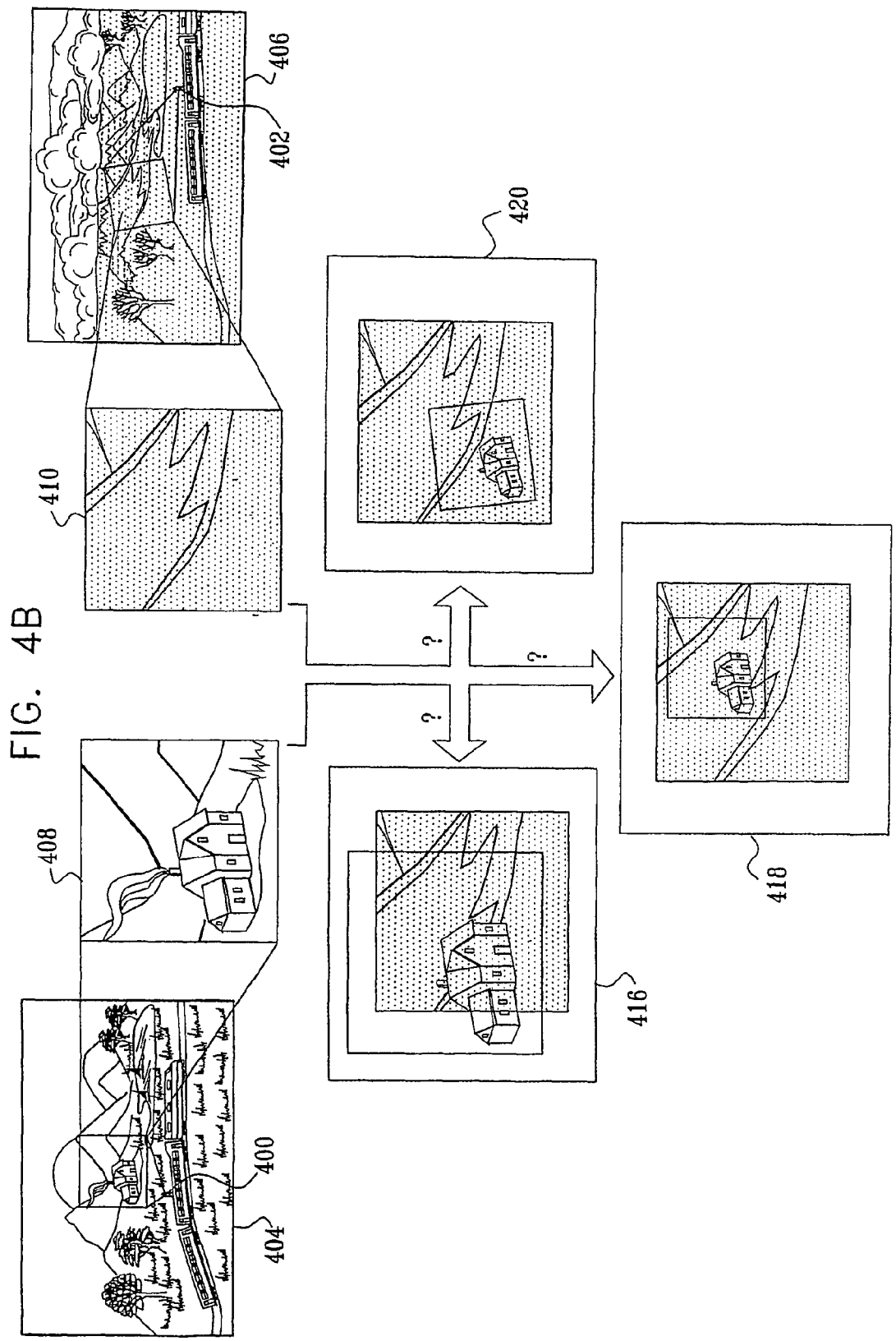
FIG. 4B illustrates inherent ambiguities in the relative spatial relationship of images in the sequences taken as shown in FIG. 4A.

Turning now to FIG. 4B, it is seen that cameras 400 and 402 image portions of the views designated by reference numerals 404 and 406 of FIG. 4A, generating respective images 408 and 410. As seen in FIG. 4C, images 408 and 410 each belong to a sequence of images, each produced by one of the moving cameras 400 and 402, the respective sequences being designated by reference numerals 412 and 414. It is seen that sequence 412 also includes images 422, 424 and 426. Likewise, sequence 414 also includes images 430, 432 and 434. It is appreciated that the images in sequence 412 are not necessarily spaced in time (taken at the same time differences) as the images in sequence 414.

It is appreciated that features imaged in the summer may be different from the features imaged in the winter due, for example to snow cover. Thus, for example, a house seen in sequence 412 is not visible in sequence 414, because it is covered by snow. Similarly snow seen in sequence 414 is not visible in sequence 412.

A problem addressed by the present invention is that the visual information contained in individual pairs of images, one belonging to sequence 412 and the other belonging to sequence 414, (e.g. (408, 410), (422, 430) or (422, 434)), is sufficient to establish neither the spatial nor the temporal relationship between two images of a pair. More generally, the visual information contained in individual pairs of images, one of the pair belonging to sequence 412 and the other of the pair belonging to sequence 414, is sufficient to establish neither the spatial nor the temporal relationship between the two sequences 412 and 414.

In the context of FIGS. 4A-4D, two images are the to be in the same "temporal relationship" if an element to which the camera is fixed is at the same location along the path. It is appreciated that the time differences between images 422, 424, 408 and 426 in sequence 412 may or may not be the same as the time differences between the images 430, 432, 410 and 434 in sequence 414.

The unknown spatial relationship of images 408 and 410 is seen graphically by considering three examples of possible relative spatial relationships shown in FIG. 4B and designated by reference numerals 416, 418 and 420. In each example, the two images 408 and 410 are placed in a different spatial relationship, all of which are consistent with the visual content of the images 408 and 410.

The unknown temporal relationship of sequences 412 and 414 is seen graphically by considering FIG. 4C. It is appreciated that it is not apparent from a cursory examination of sequences 412 and 414, which images in sequence 412 are taken from the same position along the railroad track 407 as images in sequences 414.

Figure 4D:
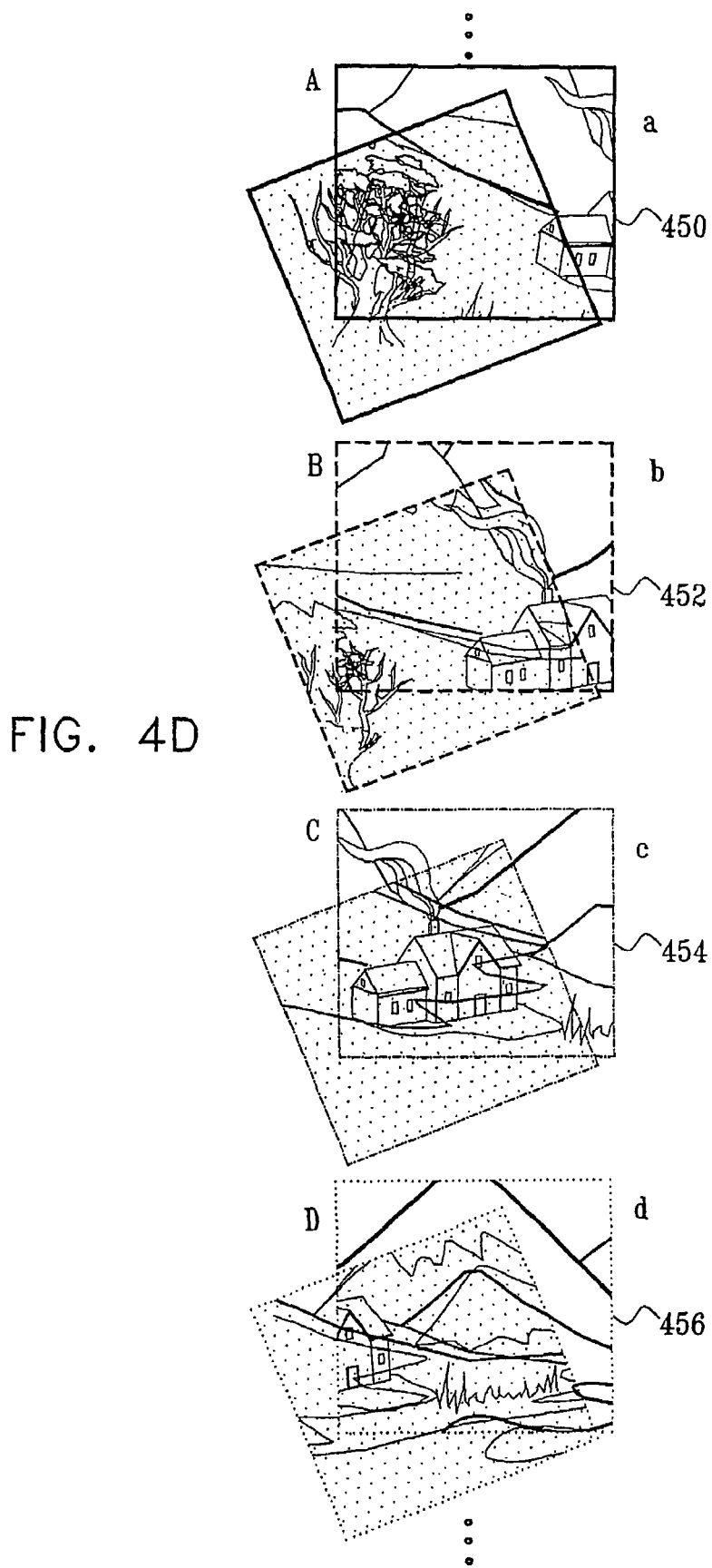
FIG. 4D illustrates pairs of images forming part of the sequences of images taken as shown in FIG. 4A, whose spatial and temporal relationships are determined in accordance with the present invention.

The present invention provides a system and technique for determining the correct relationship between the images 408 and 410 and more generally the correct spatial and temporal relationships between sequences 412 and 414, as shown in FIG. 4D. Thus, it may be appreciated that the present invention determines which image in sequence 412 corresponds temporally with which image in sequence 414 and further determines the spatial relationship between the images which correspond temporally.

Thus it is seen in FIG. 4D that image A (422) in sequence 412 is found to correspond temporally with image a (430) in sequence 414. The correct spatial relationship between images A (422) and a (430) is shown in FIG. 4D at reference numeral 450. Similarly, image B (424) in sequence 412 is found to correspond temporally with image b (432) in sequence 414, image C (408) in sequence 412 is found to correspond temporally with image c (410) in sequence 414 and image D (426) in sequence 412 is found to correspond temporally with image d (434) in sequence 414. The correct spatial relationship between images B (424) and b (432) is shown in FIG. 4D at reference numeral 452, the correct spatial relationship between images C (408) and c (410) is shown in FIG. 4D at reference numeral 454 and the correct spatial relationship between images D (426) and d (434) is shown in FIG. 4D at reference numeral 456. Thus the location of the house buried under the snow may be determined in sequence 414 although the house is not visible in that sequence.

The present invention employs an appreciation that despite there not necessarily being any common static visual information in the two sequences, the image to image dynamics in each of the two sequences are nevertheless related both spatially and temporally. The present invention utilizes the relationship between the dynamics to correlate the two sequences spatially and temporally, without requiring understanding or interpretation of the features captured by the sequences.

As will be described hereinbelow in detail, the image to image dynamics preferably are expressed by spatial transformations over time between images in each sequence. The problem of aligning sequences of images spatially and temporally is thus reduced to a problem of determining the relationship between sequences of such transformations.

It is appreciated from a consideration of FIG. 4D, that by employing the present invention aligned sequences may be realized, which sequences may then be employed to determine the location of objects visible in only some sequences across other sequences. The aligned sequences may also be employed to detect changes in a scene, such as man-made changes, which take place during a time interval between acquisitions of different sequences.

It is also appreciated that the spatial relationship may also be produced by moving at least one camera at different times and/or in different locations, along generally different trajectories, wherein the at least two trajectories are correlated as if they were produced by two cameras that are mounted rigidly on the same device or rig, and moved jointly in space.

It is appreciated that FIGS. 4A-4D show one example of a possible visualization of the output of the method of the present invention. However, the method is not limited to this particular output or this particular visualization. It is appreciated that, for example, the output can be numerical, in the form of spatial and temporal transformations, or the output can be visual in the form of aligned and/or integrated video sequences.

When numerical outputs are provided, the output transformations can be provided in various possible coordinate systems and when visual outputs are provided, there are many possible visualizations.

Figure 5A:
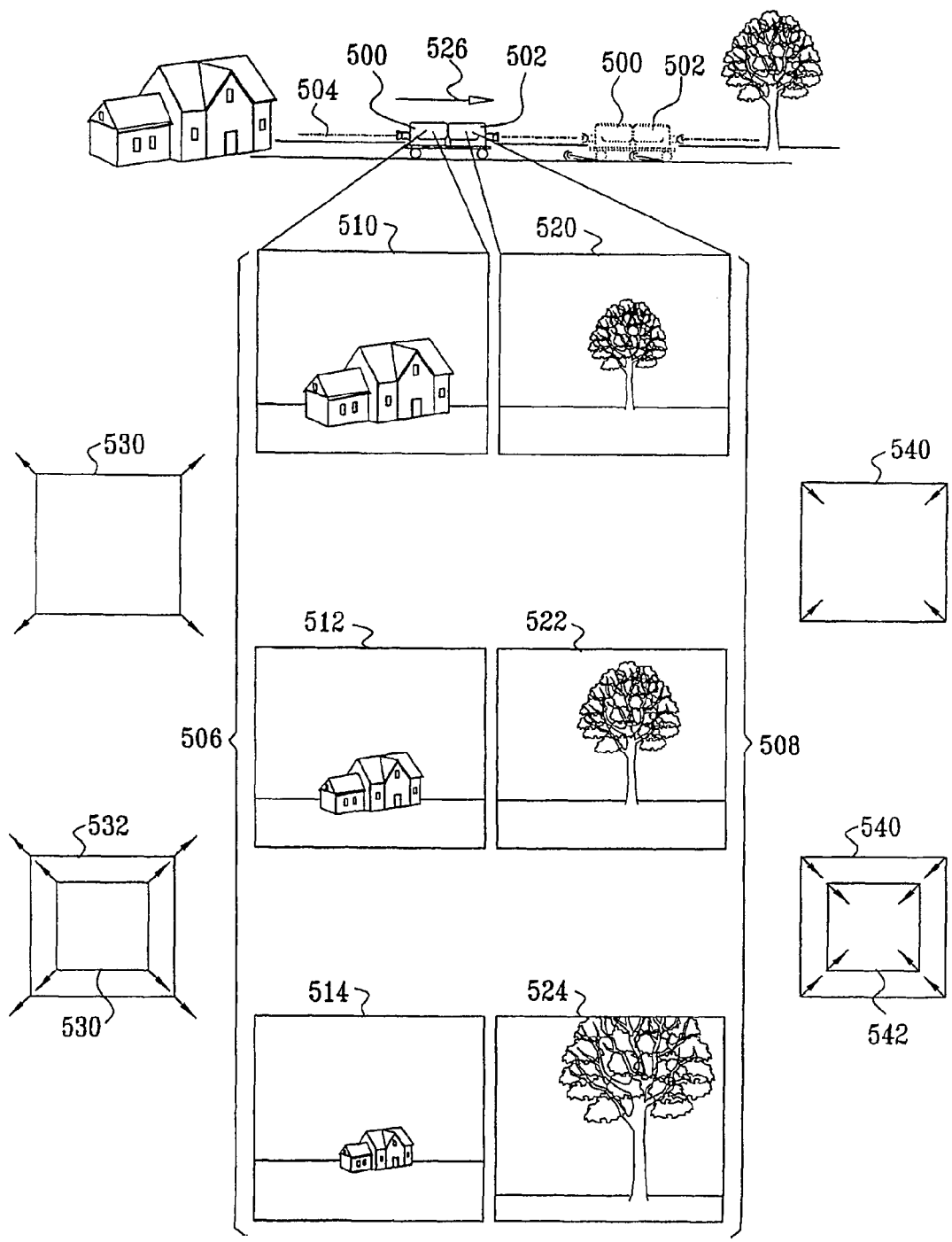
FIG. 5A illustrates the relationships between image to image transformations within two sequences, induced by motion of two cameras along an axis, the two cameras being arranged at 180 degrees with respect to each other along the axis.

Reference is now made to FIGS. 5A-5C, which illustrate an important inventive principle underlying the present invention. As noted hereinabove with reference to FIGS. 1A-4D, a difficulty exists in establishing spatial and temporal correspondence between images that have little or no visual information in common.

Noting that each of the images forms part of a sequence of images which have substantial visual information in common, the present invention overcomes this difficulty by considering intra-sequence spatial transformations between images in each sequence and by then correlating series of such intra-sequence spatial transformations across the sequences.

It is appreciated that while visual information common to images within a sequence is used to compute the intra-sequence spatial transformations, these transformations, once computed, do not include any visual information and can therefore be readily correlated across sequences. Thus, once series of intra-sequence transformation are found, there is no longer any need to refer back to the visual information in the images themselves.

It is a particular feature of the present invention that the series of intra-sequence spatial transformations of images taken by cameras whose motion is spatially and temporally interrelated, such as described in any of FIGS. 1A-4D, are spatially and temporally correlated. FIGS. 5A-5C and the following description present examples of these correlations which can be employed in accordance with the present invention to derive the spatial and temporal relationship, notwithstanding a lack of common visual information across the image sequences.

Specific reference is now made to FIG. 5A, which illustrates the relationships between image to image transformations within two sequences, induced by motion of first and second cameras 500 and 502 along an axis 504, the two cameras being arranged at 180 degrees with respect to each other along the axis. Camera 500 captures a sequence of images 506, while camera 502 captures a sequence of images 508.

Sequence 506 includes inter alia images 510, 512 and 514, while sequence 508 includes inter alia images 520, 522 and 524. It is seen that the motion of camera 500 along axis 504 in a direction indicated by arrow 526 causes an imaged scene including a house to appear smaller in image 512 than in image 510. This relationship is represented by an intra-sequence image-to-image spatial transformation and the graphical illustration of the transformation from image 510 to image 512 is designated by reference numeral 530. The arrows shown in the transformation represent the displacement of the corresponding points of the image 512 as the image 512 is transformed to image 510. Similarly, it is seen that the motion of camera 500 along axis 504 in a direction indicated by arrow 526 causes the imaged scene including the house to appear smaller in image 514 than in image 512. This relationship is represented by an intra-sequence image-to-image spatial transformation designated by reference numeral 532.

It is also seen that the motion of camera 502 along axis 504 in a direction indicated by arrow 526 causes an imaged scene including a tree to appear larger in image 522 than in image 520. This relationship is represented by an intra-sequence image-to-image spatial transformation designated by reference numeral 540. Similarly, it is seen that the motion of camera 502 along axis 504 in a direction indicated by arrow 526 causes the imaged scene including the tree to appear larger in image 524 than in image 522. This relationship is represented by an intra-sequence image-to-image spatial transformation designated by reference numeral 542.

It is appreciated from a comparison of the series of transformations 530 and 532 with the series of transformations 540 and 542 that cameras 500 and 502 appear to be directed in opposite directions as they move jointly.

Specific reference is now made to FIG. 5B, which illustrates the relationships between image to image transformations within two sequences, induced by motion of first and second cameras 550 and 552 along an axis 554, the two cameras being arranged at 90 degrees with respect to each other, one of the cameras being aligned substantially parallel to the axis of motion 554. Camera 550 captures a sequence of images 556, while camera 552 captures a sequence of images 559.

Sequence 556 includes inter alia images 560, 562 and 564, while sequence 558 includes inter alia images 570, 572 and 574. It is seen that the motion of camera 550 along axis 554 in a direction indicated by arrow 576 causes an imaged scene including a house to appear shifted sideways to the left in image 562 as compared with image 560. This relationship is represented by an intra-sequence image-to-image spatial transformation designated by reference numeral 580. Similarly, it is seen that the motion of camera 550 along axis 554 in a direction indicated by arrow 576 causes the imaged scene including the house to appear shifted sideways to the left in image 564 as compared with image 562. This relationship is represented by an intra-sequence image-to-image spatial transformation designated by reference numeral 582.

It is also seen that the motion of camera 552 along axis 554 in a direction indicated by arrow 576 causes an imaged scene including a tree to appear larger in image 572 than in image 570. This relationship is represented by an intra-sequence image-to-image spatial transformation designated by reference numeral 590. Similarly, it is seen that the motion of camera 552 along axis 554 in a direction indicated by arrow 576 causes the imaged scene including the tree to appear larger in image 574 than in image 572. This relationship is represented by an intra-sequence image-to-image spatial transformation designated by reference numeral 592.

It is appreciated from a comparison of the series of transformations 580 and 582 with the series of transformations 590 and 592 that cameras 550 and 552 appear to be directed perpendicularly to each other as they move jointly.

Specific reference is now made to FIG. 5C, which illustrates the relationships between image to image transformations within two sequences, induced by motion of first and second cameras 600 and 602 along an axis 604, the two cameras being directed in the same direction perpendicular to the direction of motion along axis 604 but at different zooms. Camera 600 captures a sequence of images 606, while camera 602 captures a sequence of images 668.

Sequence 606 includes inter alia images 610, 612 and 614, while sequence 608 includes inter alia images 620, 622 and 624. It is seen that the motion of camera 600 along axis 604 in a direction indicated by arrow 626 causes an imaged scene including a house to appear shifted sideways to the left in image 612 as compared with image 610. This relationship is represented by an intra-sequence image-to-image spatial transformation designated by reference numeral 630. Similarly, it is seen that the motion of camera 600 along axis 604 in a direction indicated by arrow 626 causes the imaged scene including the house to appear shifted sideways to the left in image 614 as compared with image 612. This relationship is represented by an intra-sequence image-to-image spatial transformation designated by reference numeral 632.

It is also seen that the motion of camera 602 along axis 604 in a direction indicated by arrow 626 causes an imaged scene including the house to appear shifted sideways to the left in image 622 as compared with image 620. This relationship is represented by an intra-sequence image-to-image spatial transformation designated by reference numeral 640. Similarly, it is seen that the motion of camera 602 along axis 604 in a direction indicated by arrow 626 causes the imaged scene including the house to appear shifted sideways to the left in image 624 as compared with image 622. This relationship is represented by an intra-sequence image-to-image spatial transformation designated by reference numeral 642. It is noted that the sideways shifts represented by transformations 640 and 642 are larger than those represented by transformations 630 and 632 due to the difference in zooms.

It is appreciated from a comparison of the series of transformations 630 and 632 with the series of transformations 640 and 642 that cameras 600 and 602 appear directed in the same direction perpendicular to the direction of motion along axis 604 but at different zooms as they move jointly.

Reference is now made to FIGS. 6A, 6B and 6C, which together illustrate that computational functionality employing one type of transformation may not be sufficient for resolving ambiguities in the spatial and temporal relationships between sequences but that employing multiple different types of transformations reduces ambiguities in the spatial and temporal relationships between sequences.

Turning to FIG. 6A, it is seen that intra-sequence spatial transformations 650 and 652 representing two oppositely directed sideways movements, each belonging to a sequence taken by a different camera, can represent at least two different arrangements of the cameras. One such arrangement, designated by reference numeral 654 is of first and second cameras, 656 and 658 respectively, moving in a direction 660 along an axis 662 and being arranged in a mutual upside down arrangement and both directed in parallel perpendicular to axis 662.

Another possible arrangement, designated by reference numeral 664, is of cameras 656 and 658 being arranged at 180 degrees with respect to each other, directed perpendicular to the axis 662 and moving along axis 662 in a direction 660 therealong.

Turning to FIG. 6B, it is seen that intra-sequence spatial transformations 670 and 672 representing forward and backward motion respective, each belonging to a sequence taken by a different camera, can represent at least two different arrangements of the cameras. One such arrangement, designated by reference numeral 664 is of first and second cameras, 656 and 658 respectively, moving in a direction 680 along an axis 682 and being arranged at 180 degrees with respect to each other along axis 682.

Another possible arrangement, designated by reference numeral 684, is of cameras 656 and 658 being arranged at 180 degrees with respect to each other along axis 682 for motion in a direction 680 therealong, wherein one of the cameras 656 is rotated about axis 682 with respect to the other one of the cameras 658.

Turning to FIG. 6C, it is seen that two series of intra-sequence spatial transformations 690 and 692, each taken by a different moving camera, and containing transformations of different types, are employed by computational functionality to resolve ambiguities of the type described hereinabove with reference to FIGS. 6A and 6B. Series 690 comprises transformation 650 (FIG. 6A) followed by transformation 670 (FIG. 6B), while series 692 comprises transformation 652 (FIG. 6A) followed by transformation 672 (FIG. 6B).

It is seen that only one of the three camera configurations shown in FIGS. 6A, 6B and 6C is possible, namely that configuration designated by reference numeral 664 in FIGS. 6A and 6B.

FIGS. 1A to 4D described hereinabove present four typical applications of the present invention. In these four applications the present invention provides alignment between images of two sequences of images notwithstanding that there is insufficient similarity between any image of one sequence to any image of the other sequence to enable the prior art to provide image to image alignment. "Similarity" of images is used here in a broad sense and includes, inter alia, gray-level similarity, feature similarity, similarity of frequencies and statistical similarity, such as mutual information. Consequently, in the prior art, at least partial overlap between the images is required to obtain similarity.

In contrast to the prior art, which requires overlap between images in order to mutually align them, the present invention employs correlated temporal behavior between the two sequences, as shown and described with reference to FIGS. 5A to 6C, to resolve both the spatial and the temporal transformations between images of the two sequences. A feature of the present invention is the ability to replace the requirement for "coherent appearance", which is a fundamental assumption in the prior art, with the requirement for "consistent temporal behavior" which is often easier to satisfy, for example by moving the two cameras jointly in space.

In one application of the present invention, shown and described hereinabove with reference to FIGS. 1A to 1D, the two sequences are produced concurrently by two cameras moving jointly in space. The term 'concurrently' here designates that the two sequences are produced at least partially during the same period of time. The concurrency does not require that images, or frames, of the two sequences be produced simultaneously or even at the same rate. 'Moving jointly' here means that the two cameras have, for practical purposes, the same center of projection throughout the sequences. This may be realized, for example by fixedly attaching both cameras to the same moving rig. In reality, the centers of projection of the two cameras are not at precisely the same location. However in the mathematical treatment which follows, the centers of projection of both cameras are considered as if they were at the same location. It is further appreciated that the mathematical principles employed in the mathematical treatment are also applicable to situations where the centers of projection of the cameras are clearly not at the same location but are at locations whose spatial relationship is fixed. It is additionally appreciated that the mathematical principles employed in the mathematical treatment are also applicable to situations where the centers of projection of the cameras are clearly not at the same location but are at locations having an at least partially known spatial/temporal relationship.

In another application of the present invention, shown and described hereinabove with reference to FIGS. 2A to 2D and FIGS. 3A to 3D, the two sequences contain images that are partially overlapping. However the similarity between the images is very low or even nonexistent, namely, no detail of any image of one sequence can be identified in any image of the second sequence.

In the applications shown and described hereinabove with reference to FIGS. 2A to 2D, the two sequences are produced by cameras employing significantly different zoom. Similar applications may relate to sequences produced by cameras having significantly different magnification or resolution.

In the applications shown and described hereinabove with reference to FIGS. 3A to 3D, the two sequences are produced by cameras employing different sensing modalities. Typical sensing modalities include: using a photographic camera, such as a still film camera, a digital camera, a video camera or a motion film camera; employing infra-red imaging equipment, radar, x-ray, CAT-scan, MRI or other electromagnetic imaging equipment, acoustic imaging equipment, such as ultrasound, sonar and sub-acoustic geophysical surveillance equipment, satellite remote sensing equipment.

In yet another application of the present invention shown and described hereinabove with reference to FIGS. 4A to 4D, the two sequences are produced at different times but the two cameras that produce the respective two sequences are moving generally along the same path. The sequences may not have any spatial overlap or may have a partial overlap but still lack a degree of similarity required by the prior art. Such lack of similarity may result from differences in internal camera calibration, such as magnification, zoom and resolution, or from employing different sensing modalities. This lack of similarity may also result from changes in the scene, such as changes caused by the seasons, as illustrated in FIGS. 4A to 4D, or due to differences in visibility between the two sequences.

The mathematical treatment which follows employs an appreciation that despite there not necessarily being any common static visual information in the two sequences, the image to image dynamics in each of the two sequences are nevertheless related both spatially and temporally. This mathematical treatment utilizes the relationship between the dynamics to correlate the two sequences in time and space, without requiring understanding or interpretation of the features captured by the sequences.

As will be described hereinbelow in detail, the image to image dynamics preferably are expressed by spatial transformations over time between images in each sequence. The problem of aligning sequences of images in time and space is thus reduced to a problem of determining the relationship between sequences of such transformations in time and in space.

The motions of the two cameras induce motions to the two sequences. The induced motions may be different for the two sequences but are correlated. Although the motions of the cameras are not known, the correlation between the induced motions serves to correlate between sequences both in time and in space.

To correlate two images using the image to image dynamics, it is required that:
(1) Each of the images must be a part of a temporal sequence of images;
(2) The two sequences must be produced during relative motion between cameras and a scene;
(3) The optical parameters of the two cameras must not change other than in a known manner throughout the production of the two sequences.

The mathematical treatment which follows also imposes the following requirement in the examples presented therein:
(4) The cameras producing the two sequences must have approximately the same center of projection throughout the production of the two sequences.

The present invention does not require that any single image in one sequence of images have any spatial or visual similarity with any single image in the other sequence. Consequently and in addition, the present invention provides alignment between two images belonging to two sequences of images when the level of similarity between these images is insufficient to provide alignment by employing the prior art.

The present invention normally does not require any prior internal or external camera calibration at any time.

Each of the two preferred embodiments of the present invention described hereinbelow is applicable to one of the following two situations:
(a) A substantial portion of the scene is either planar or distant from the cameras producing the two sequences of images;
(b) The scene is effectively three-dimensional.

It is appreciated that the two situations each pertain to all the applications described hereinabove in accordance with FIGS. 1A to 4D.

As shown and described hereinabove with reference to FIGS. 6A to 6C, simple camera motion may not be sufficient to resolve the spatial and the temporal transformations between images of the two sequences. Therefore several different types of camera motions may be required. Three examples of such camera motion are shown in FIGS. 5A to 5C, it being understood that other, perhaps better, examples of camera motion may exist. An embodiment of the present invention described hereinbelow provides assessment of the required complexity of the motion.

Reference is now made to FIG. 7, which is a simplified illustration of a complex motion 700 of two cameras 702 and 704, fixed to each other, each camera producing a sequence of images of a portion of a scene 703, the sequences being 706, 708, 710 and 712, 714 and 716 correspondingly, the portions of the scene photographed by the two cameras being non-overlapping.

Reference is now made to FIG. 8, which is a simplified illustration portions of two sequences 720 and 722 of images taken as shown in FIG. 7, wherein the two sequences are spatially related by a fixed and unknown inter-camera homography and temporally related by a fixed and unknown time shift $\Delta t$. The symbols $I_i$, $T_i$, $T'_i$ and H are defined hereinbelow.

Reference is now made to FIG. 9, which is a functional block diagram of a preferred sequence of steps of implementation of a preferred embodiment of the present invention.

In step 900 two cameras 910 and 920 are employed to produce two sequences of images 930 and 940.

Let S be a first sequence of images $I_i$ produced by a first camera and let S' be a second sequence of images $I'_i$ produced by a second camera, for example as shown and described in accordance with any of the FIGS. 1A to 8 hereinabove, and wherein $S = I_i, \ldots, I_{n+1}$ and $S' = I'_i, \ldots, I'_{n+1}$.

The two input sequences have an unknown temporal relation and an unknown spatial relation between them.

In a preferred embodiment of the present invention the spatial relation may represent the fact that the two cameras are firmly attached to each other.

In another preferred embodiment of the present invention the two cameras are mounted rigidly on the same device or rig, and moved jointly in space.

In yet another preferred embodiment of the present invention the spatial relation may represent the fact that the cameras are moving in a generally identical trajectory but at different times.

In an additional preferred embodiment of the present invention the spatial relation is produced by moving at least one cameras in a generally identical trajectory but in at least one of a different time and a different location, wherein there is a fixed relative position and a fixed relative orientation between the two cameras and wherein the optical properties of each of the two cameras do not change between the images $I_i$ and $I_{i+1}$ and between $I'_i$ and $I'_{i+1}$.

In a further preferred embodiment of the present invention the spatial relationship is produced by moving at least one cameras in a generally identical trajectory but in at least one of a different time and a different location, wherein the relative position and a relative orientation between the two cameras may change in a known way and wherein the optical properties of each of the two cameras may change between the images $I_i$ and $I_{i+1}$ and between $I'_i$ and $I'_{i+1}$ in a known way.

In a further preferred embodiment of the present invention the spatial relationship is produced by moving at least one camera at different times and/or in different locations, along generally different trajectories, wherein the at least two trajectories are correlated as if they were produced by two cameras that are mounted rigidly on the same device or rig, and moved jointly in space.

The temporal relation between the two sequences represents the time when the two cameras were in the spatial relation as described hereinabove.

In a preferred embodiment of the present invention the two sequences are produced by employing synchronization equipment to synchronize between the two cameras. In this case the temporal relation between the two sequences represents the fact that the image $I_i$ and the corresponding image $I'_i$ are produced together.

In another preferred embodiment of the present invention the temporal relation between the two sequences represents the fact the image $I_i$ and the corresponding image $I'_i$ are produced with a fixed time delay between them.

In yet another preferred embodiment of the present invention the temporal relation applies to image $I_i$ and a point in sequence S' that is between a corresponding $I'_i$ and image $I'_{i+1}$.

In yet another preferred embodiment of the present invention the temporal relation applies to two sequences produced employing two cameras employing two different frame rates.

In a preferred embodiment of the present invention the temporal relation between the two sequences may represent the fact that the two images are the to be in the same "temporal relationship" if the cameras producing the sequences were in the same location in the same time.

It is appreciated that temporal relation between sequences may exist even if the temporal relation between images may hold only for virtual images, that is, for images that have not been produced but could have been produced if the camera was producing an image at that time.

It is also appreciated, that S and S' are not necessarily the original sequences, but may be subsequences of the original sequences, where subsequence may represent, a portion of the field-of-view, temporal portion of the sequence, sub-sampling of pixels, and sub-sampling of frames.

The sequences S and S' may be produced in several methods as described hereinbelow:

The first and the second camera may have a different 3D orientation and move jointly in space, such as the camera pairs shown in FIG. 7. In a preferred embodiment of the present invention none of the images $I_i$ contains any feature contained in any of the images $I'_i$, however, there is at least a partial temporal overlap between S and S'.

In another preferred embodiment of the present invention the first camera and the second camera have at least partially overlapping fields of view, wherein images $I_i$ comprises details that are not comprised in the overlapping parts of the corresponding images $I'_j$ and wherein the two cameras move jointly in space, such as the camera pair shown and described in accordance with FIGS. 3A to 3D hereinabove.

In yet another preferred embodiment of the present invention the sequence S and the sequence S' may be produced by the same camera moving in at least approximately the same pattern in space and at different times.

Also in another preferred embodiment of the present invention the sequence S and the sequence S' may be produced by two cameras moving in at least approximately the same pattern in space and at different times.

It is appreciated that the sequences S and S' may be produced by any image producing instrument that produces at least two dimensional images of space, such as photographic camera, such as still film camera, digital camera, video camera or motion film camera, infra-red imaging equipment, radar, x-ray, CAT-scan, MRI and other electromagnetic imaging equipment, acoustic imaging equipment, such as ultrasound, sonar and sub-acoustic geophysical surveillance equipment and satellite remote sensing equipment. It is also appreciated that the two sequences S and S' may be produced by image producing instruments of the same type or of different types.

It is appreciated that neither of the two sensors has to be calibrated.

The temporal correspondence can be achieved electronically, for example by employing Genlock, or recovered using the method describe hereinbelow with reference to element 960 of FIG. 9.

Furthermore, a method for computing temporal relation described hereinbelow can compute temporal relation at sub-frame time units. In this case a temporal relation is computed between a transformation $T_j$ and a transformation $T'_{j+\delta}$ wherein $T_{j+\delta}$ is interpolated from $T_j$ and $T_{j+1}$. The sequence of transformations $T_{j+\delta}$ applies to virtual images $I_{j+\delta}$ wherein in the virtual images were not actually produced by the camera producing image sequence S', but could have been produced by the camera if the images produced at the appropriate time points and are therefore interpolated representations of the scene.

Reference is now made to step 990 of FIG. 9. It can now be assumed that the transformations and images are temporally synchronized.

Let H be a spatial transformation function that transforms between a coordinate system of sequence S and a coordinate system of sequence S'. Applying the transformation H on the sequence S' results in the content of images $I'_i$ in the coordinates of the sequence S, as if the transformed sequence S' has been produced by the camera that has produced the sequence S. Therefore:

$p'=H(p)$ where p' is the feature p of $I_i$ in the coordinates of $I'_i$.

In one preferred embodiment of the present invention, typically where the two cameras have approximately the same center of projection, H is a 3×3 inevitable matrix.

Such H is denoted here as a "homography", the terms collination and 2D projective transformation may be equally used. In this case p and p' are given in homogeneous coordinates and the equation $p'=H(p)$ becomes $p' \cong Hp$ where $\cong$ denotes equation up to a scale factor.

In another preferred embodiment of the present invention, typically where the two cameras have a different center of projection and are firmly attached to the same rig H is a 4×4 inevitable Euclidean or inevitable projective matrix.

However, the two sequences S and S' do not share sufficient common feature or any other properties of the images. Therefore we cannot compute H from common properties of the images $I_i$. Instead H is computed by correlating between properties of the temporal progressions within each sequence In a preferred embodiment of the present invention H is computed from the induced frame to frame transformation within each of the sequences S and S'.

Let T be a first sequence of frame-to-frame transformations $T_i$ and let T' be a second sequence of frame-to-frame transformations $T'_i$ wherein $T=T_1, \ldots, T_{n+1}$ and $T'=T'_1, \ldots, T'_{n+1}$ and wherein $I_{i+1} \cong T_i I_i$ and $I'_{i+1} \cong T'_i I'_i$.

In a preferred embodiment of the present invention, a large portion of the scene that is photographed by the two cameras, producing the sequences S and S', is planar or distant from the cameras. In this case $T_i$ and $T'_i$ are 3×3 non-singular matrices.

Let P be a three dimensional point in the planar or distant scene and let $p_i$ and $p'_i$ be the homogeneous coordinates of the projection of the point P in the images $I_i$ and $I'_i$, respectively. It is noted that there is no need for P to appear in both or in any of the images $I_i$ and $I'_i$, that is, within the field of view of the cameras when images $I_i$, or $I'_i$ are produced. Let $p_{i+1}$, and $p'_{i+1}$ be the coordinates of the projection of the point P in images $I_{i+1}$ and $I'_{i+1}$ respectively.

Then:

$$P_{i+1} \cong T_i p_i \text{ and } p'_{i+1} \cong T'_i p'_i$$

and $$p'_i \cong H p_i \text{ and } p'_{i+1} \cong H p_{i+1}$$

and therefore Eq. (1) is:

$$H T_i p_i \cong H p_{i+1} \cong p'_{i+1} \cong T'_i p'_i \cong T'_i H p_i$$

and therefore Eq. (2) is:

$$H T_i \cong T'_i H$$

This operation is also referred to as "matrix composition".

Since H is inevitable then Eq. (3) is:

$$T'_i = s_i H T_i H^{-1} \text{ where s is a frame dependent scale factor.}$$

Eq.(3) is true for all the images, that is, for any pair of temporally corresponding transformations $T_i$ and $T'_i$, where $i=1, \ldots, n$. This equation shows that there is a similarity relation between the two matrices $T_i$ and $T'_i$ up to a scale factor. A matrix A is the to be "similar" to a matrix B if there exists an inevitable matrix M such that $A=MBM^{-1}$. The term "conjugate matrices" can be used instead of "similar matrices".

Let $eig(A)=[\lambda_1, \lambda_2, \mu_3]^t$ be a 3×1 vector containing, in decreasing order, eigenvalues of a 3×3 matrix A. $\square^t$ denotes the transpose vector. It is known in the art, as described for example in C. E. Pearson (ed.). Handbook of applied mathematics Second Edition. Van Nostrand Reinhold Company, New York, 1983, pp 898, that: If A and B are similar matrices then they have the same eigenvalues: $eig(A)=eig(B)$, and, the eigenvalues of a scaled matrix are scaled: $eig(sA)=s(eig(A))$.

Using these two facts and Eq. (3) we obtain Eq. (4) hereinbelow:

$$eig(T'_i) = s_i eig(T_i) \text{ where si is the scale factor defined by Eq. (3).}$$

Equation (4) implies that $eig(T_i)$ and $eig(T'_i)$ are "parallel". This gives rise to a measure of similarity between two matrices $T_i$ and $T'_i$, denoted by $sim(T_i, T'_i)$ and presented in Eq. (5) hereinbelow:

$$sim(T_i, T'_i) = \frac{eig(T_i)^t eig(T'_i)}{\|eig(T_i)\| \|eig(T'_i)\|},$$

where $\|\cdot\|$ is the vector norm.

For each pair of the temporally corresponding transformations $T_i$ and $T'_i$, in the sequences S and S' the eigenvalues $eig(T_i)$ and $eig(T'_i)$ are first computed. The scale factor $s_i$ which relates the eigenvalues $eig(T_i)$ and $eig(T'_i)$ is then estimated from Eq. (4). Eq. (4) is a set of three equations with one unknown and can be solved using least squares minimization. Alternatively, the input homographies $T_i$ and $T'_i$ can be normalized to have determinant equal 1 and to avoid the need to compute $s_i$.

Once $s_i$ is estimated, Eq. (3) or Eq. (2) can be rewritten in the form of Eq. (6) hereinbelow:

$$s_i H T_i - T'_i H = 0$$

Equation (6) is linear in the unknown components of H. Rearranging the components of H in a 9×1 column vector $\vec{h} = [H_{11} H_{12} H_{13} H_{21} H_{22} H_{23} H_{31} H_{32} H_{33}]^t$, Eq. (6) can be rewritten as a set of linear equations in h in the form of Eq. (7) hereinbelow:

$$M_i \vec{h} = \vec{0}$$

wherein $M_i$ is a 9×9 matrix defined by $T_i$, $T'_i$ and $s_i$:

$$M_i = \begin{bmatrix} s_i T_i^i - T'_{i_{11}} I & -T'_{i_{12}} I & -T'_{i_{13}} I \\ -T'_{i_{21}} I & s_i T^i - T'_{i_{22}} I & -T'_{i_{23}} I \\ -T'_{i_{31}} I & -T'_{i_{32}} I & s_i T^i - T'_{i_{33}} I \end{bmatrix}_{9 \times 9}$$

and wherein I is the 3×3 identity matrix.

Eq. (7) implies that each pair of corresponding transformations $T_i$ and $T'_i$ contributes 9 linear constrains in the unknown homography H (i.e., $\vec{h}$).

The constraints from all the transformations $T_1, \ldots, T_n$ and $T'_1, \ldots, T'_n$ can be combined into a single set of linear equations in $\vec{h}$ provided by Eq (8) hereinbelow:

$$A\vec{h} = \vec{0} \text{ where A is a 9n×9 matrix:}$$

$$A = \begin{bmatrix} M_1 \\ \vdots \\ M_n \end{bmatrix}$$

Equation (8) is a homogeneous set of line equations in $\vec{h}$ that can be solved in a variety of ways. In a preferred embodiment of the present invention $\vec{h}$ is solved by computing the eigenvector which corresponds to the smallest eigenvalue of the matrix $A^t A$.

In another preferred embodiment of the present invention the scene for which the sequences S and S' have been produced is neither planar nor distant. In this case the temporal progression between any two consecutive images $I_i$ and $I_{i+1}$ is described by a fundamental matrix $F_i$.

The fundamental matrix F defines the relation between corresponding image points $p_i$ so that:

if $p_i$ in $I_i$ and $p_{i+1}$ in $I_{i+1}$ are corresponding image points, then $p'_{i+1} F_i p_i = 0$ wherein $F_i$ are each a 3×3 matrix of rank 2.

Let F be a sequence of fundamental matrices $F_i$ wherein $F = F_1, \ldots, F_n$. Respectively, the temporal progression between any two consecutive images $I'_i$ and $I'_{i+1}$ is described by $F'_i$, wherein $F' = F'_1, \ldots, F'_n$.

Many methods for computing fundamental matrices are known in the prior art. One such method is taught by P. H. S. Torr and A. Zisserman in "Feature based methods for structure and motion estimation" in the proceedings of the Vision Algorithms Workshop pages 279-290, Corfu, 1999. Another method is taught by Z. Zhang, R. Deriche, O. Faugeras, and Q. Luong in "A robust technique for matching two uncalibrated images through the recovery of the unknown epipolar geometry" in the journal of Artificial Intelligence, 78:87-119, 1995.

The two sequences S and S' may not share sufficient common features or any other properties of the images. Therefore the spatial and the temporal relations between the sequences S and S' are computed by correlating between properties of the temporal progressions $F = F_1, \ldots, F_n$ and $F'_1, \ldots, F'_n$ within each sequence.

It is appreciated that neither of the two cameras has to be calibrated.

It is appreciated that because the two cameras share the same center of projection the inter-camera transformation remains a homography H although the relations within each sequence are characterized by fundamental matrices, In a preferred embodiment of the present invention, where the scene for which the sequences S and S' have been produced is neither planar nor distant, H is computed from properties of the temporal progression output as expressed by the sequences F and F' of the matrices $F_i$ and $F'_i$.

Each fundamental matrix F, can be decomposed into a homography+epipole as described by Eq. (9) hereinbelow:

$F_i = [e_i]_x T_i$ wherein $e_i$ is the epipole relating frames $I_i$ and $I_{i+1}$;

wherein the matrix $T_i$ is the induced homography from $I_i$ to $I_{i+1}$ via any plane, real or virtual; and wherein $[\cdot]_x$ is the cross product matrix $[v]_x \vec{w} = \vec{v} \times \vec{w}$.

The homographies, $T_1, \ldots, T_n$ and $T'_1, \ldots, T'_n$, and the epipoles $e_1, \ldots, e_n$ and $e'_1, \ldots, e'_n$, impose separate constraints on the inter-camera homography H. These constraints can be used separately or jointly to recover H as described. hereinbelow.

(i) Homography-Based Constraints:

The homographies $T_1, \ldots, T_n$ and $T'_1, \ldots, T'_n$ extracted from the fundamental matrices $F_1, \ldots, F_n$ and $F'_1, \ldots, F'_n$, respectively may correspond to different three dimensional planes. In order to apply the algorithm described above for the case of a planar or a distant scene, using these homographies, we have to impose plane-consistency across the two sequences, to guarantee that temporally corresponding homographies correspond to the same plane in the three dimensional world.

In a preferred embodiment of the present invention the "Plane+Parallax" method which is well known in the prior art, is used to impose plane-consistency across and within the two sequences $T_1, \ldots, T_n$ and $T'_1, \ldots, T'_n$. The Plane+Parallax method describes the image-to-image transformation using two components: homography and residual parallax. The homography is associated with a selected plane and relates points on this plane between the two images. The parallax component describes the residual displacement of off-plane points. The "Plane+Parallax" method requires that a real physical planar surface be visible in all images $I_i$ and $I'_i$.

One method for computing a Plane+Parallax transformation is taught by M. Irani, P., Anandan and D. Weinshall in "From reference frames to reference planes: Multi-view parallax geometry and applications" in the proceedings of the European Conference on Computer Vision, Freiburg, June 1998.

Another method for computing a Plane+Parallax transformation is taught by R. Kumar, P. Anandan and K. Hanna in "Direct recovery of shape from multiple views: parallax based approach" in the proceedings of the International Conference on Pattern Recognition, 1994.

Yet another method for computing a Plane+Parallax transformation is taught by Harpreet Sawhney in "3D geometry from planar parallax" in the proceedings of the IEEE Conference on Computer Vision and Pattern Recognition, June 1994.

Another method for computing a Plane+Parallax transformation is taught by A. Shashua and N. Navab in "Relative affine structure: Theory and application to 3D reconstruction from perspective views" in the proceedings of the IEEE Conference on Computer Vision and Pattern Recognition, pages 483-489, Seattle, Wash., June 1994.

The homography part of the Plane+Parallax transformation is then used in the same manner as in the planar or distant case described hereinabove.

In another preferred embodiment of the present invention the "threading" method, as described for example in S. Avidan and A. Shashua. Threading fundamental matrices. In European Conference on Computer Vision, 1998, which is also well known in the prior art, is used to impose plane-consistency across and within the two sequences $T_1, \ldots, T_n$ and $T'_1, \ldots, T'_n$. The "threading" method can impose plane-consistency within each sequence, even if no real physical plane is visible in any of the frames.

It is appreciated that there are other methods in the prior art for computing a consistent set camera matrices. It is appreciated that the term camera matrix refers to a 4×3 matrix, which is comprised of a 3×3 left minor. matrix and a 1×3 vector, wherein the 3×3 left minor matrix represents a 3×3 homography. The consistency of the camera matrices imposes plane-consistency on the 3×3 homographies.

In a preferred embodiment of the present invention plane consistency between the two sequences is provided by applying the threading method on each of the two sequences S and S', by initiating the threading method at frames which are known to simultaneously view the same real plane in both sequences.

It is appreciated that the two cameras can see different portions of the plane, allowing for non-overlapping fields of view, and need not see the plane at any of the other images.

(ii) Epipole-Based Constraints:

In a preferred embodiment of the present invention the homography H is computed from epipoles $e_i$ and $e'_i$, which are computed from the fundamental matrices $F_i$ and $F'_i$. Given two images $I_i$ and $I_{i+1}$, an epipole denotes the spatial location of the center of projection of the camera for image $I_{i+1}$ in the coordinates system of image $I_i$. The fundamental matrices $F_1, \ldots, F_n$ and $F'_1, \ldots, F'_n$ provide a list of epipoles $e_1, \ldots, e_n$ and $e'_1, \ldots, e'_n$, wherein an epipole $e_i$ is the null space of a fundamental matrice $F_i$ and an epipole $e'_i$ is the null space of a fundamental matrice $F'_i$.

It is appreciated that the epipoles $e_i$ and $e'_i$ can be computed by other methods than from the null space of the fundamental matrices $F_i$ and $F'_i$ respectively. There are many other methods known in the prior art to find epipoles between two images.

The epipoles $e_i$ and $e'_i$ are uniquely defined and therefore there is no issue of plane consistency. Since the two cameras have the same center of projection, then for any pair of images $e_i$ and $e'_i$ H satisfies the equation:

$$e'_i \cong He_i$$

which yields Eqs. (10a and 10b) hereinbelow:

$$(e'_i)_x = \frac{[h_1 h_2 h_3] e_i}{[h_7 h_8 h_9] e_i}, \text{ and } (e'_i)_y = \frac{[h_4 h_5 h_6] e_i}{[h_7 h_8 h_9] e_i}.$$

Multiplying by the denominator and rearranging terms yields two new linear constrains on H for every pair of corresponding epipoles $e_i$ and $e'_i$ as described in Eq. (11) hereinbelow:

$$\begin{bmatrix} e_i^i & \vec{0}^i & (e'_i)_x e_i^i \\ \vec{0}^i & e_i^i & (e'_i)_y e_i^i \end{bmatrix}_{2 \times 9} \vec{h} = 0$$

where $\vec{0}^t = [0,0,0]$.

Therefore, every pair of temporally corresponding epipoles $e_i$ and $e'_i$ imposes two linear constraints on H. The two sequences $e_1, \ldots, e_n$ and $e'_1, \ldots, e'_n$ provide a homogeneous linear system of 2n equations, wherein Eq(11) is one pair of these 2n equations.

The system of 2n equations can be solved for H in a variety of ways.

In a preferred embodiment of the present invention $\vec{h}$ is solved by computing the eigenvector which corresponds to the smallest eigenvalue. Theoretically, four pairs of corresponding epipoles $e_i$ and $e'_i$ are sufficient, provided that no three epipoles are on the same line.

Alternatively, H can be solved by adding the system of 2n equations to the set of linear equations in Eq. (8) which are imposed by the homographies.

Reference is now made to step 960 of FIG. 9.

In yet another preferred embodiment of the present invention the sequences S and S' are not temporally synchronized. Namely, the image $I_i$ in sequence S corresponds to image $I'_{i+\Delta t}$ in sequence S' and $\Delta t$ is unknown. Therefore the transformation $T_i$ corresponds to transformation $T_{i+\Delta t}$ and not to $T'_i$. If time stamping, or similar additional information, is available for each image $I_i$ and $I'_i$ then synchronization can be recovered. When there is no additional information to recover the synchronization, the synchronization can be recovered in using the method hereinbelow.

Given two unsynchronized sequences of transformations $T_1, \ldots, T_n$ and $T'_1, \ldots, T'_m$, wherein $T_i$ and $T'_{i+\Delta t}$ are temporally corresponding transformations. According to Eq. (4) $\text{eig}(T_i) \| \text{eig}(T'_{i+\Delta t})$ meaning that the 3×1 vectors of eigenvalues are parallel, namely there is an angle of 0° between the two vectors. Therefore the similarity measure $\text{sim}(T_{t_i}, T'_{t'_{i+\Delta t}})$ of Eq. (5) is equal to 1, corresponding to cos(0). All pairs of temporally corresponding transformations $T_i$ and $T_{i+\Delta t}$, must simultaneously satisfy this constraint. When the unknown temporal shift $\Delta t$ can be modeled by a set of parameters $\Delta t_i = f(i, a_i \ldots a_n)$, then the parameters can be recovered by maximizing the following objective function presented hereinbelow as Eq. (12):

$$SIM(a_i, \ldots, a_n) = \sum_i sim(T_i, T_{i+\Delta t_i})^2$$

For example, when the unknown $\Delta t$ is a simple global temporal shift, it can be recovered by maximizing the following objective function presented hereinbelow as Eq. (12.a):

$$SIM(\Delta t) = \sum_i sim(T_i, T_{i+\Delta t})^2$$

In a preferred embodiment of the present invention the maximization is performed by an exhaustive search over a finite range of valid time shifts $\Delta t$.

Alternatively, to address larger temporal shifts, a hierarchical search is applied. Coarser temporal levels are constructed by composing transformations to obtain fewer transformation between more distant frames.

In still another preferred embodiment of the present invention the images in sequence S are produced at a different rate than the images of sequence S'. For example, when sequence S is produced by an NTSC camera at 30 frame per second and sequence S' is produced by a PAL camera at 25 frames per second. The ratio between the rate of recording of the two sequences S and S' is fixed and in the case of PAL and NTSC cameras it is 25:30=5:6. Therefore, the objective function that should be maximized for an PAL-NTSC pair of sequences as presented by Eq. (13) hereinbelow:

$$SIM(\Delta t) = \sum_i sim(T_{5i}^{5(i+1)}, T'^{6(i+1)+\Delta t}_{6i+\Delta t})^2$$

where $T_i^j$ is the transformation from frame $I_i$ to frame $I_j$.

PAL and NTSC video cameras produce each image as pair of fields, wherein the first field comprises the odd lines of the image and the second field comprises the even lines of the picture. The fields are produced in a rate that is double the rate of the images, or frames, that is at 60 and 50 fields per second respectively. The method described above with respect to Eq. (12.a) can recover synchronization to the field level. Sub-field accuracy can be recovered by interpolating the values of $SIM(\Delta t)$ obtained at discrete time shifts.

In a preferred implementation of the present invention the transformations are interpolated according to the computed temporal correspondence and $SIM(\Delta t)$ is re-estimated, in an iterative manner, to increase the temporal accuracy.

In order to solve H it is required to have a sufficient number $N_{min}$ of corresponding pairs of frame-to-frame transformations $T_i$ and $T'_i$.

In a preferred embodiment of the present invention the number $N_{min}$ is assessed by examining via the similarity equation Eq. (3) the number of constraints imposed on H by a single pair of transformations $T_i$ and $T'_i$.

The scale factor $s_i$ can be extracted directly from $T_i$ and $T'_i$ as described hereinabove with reference to element 950 of FIG. 9 and therefore can be omitted from Eq. (3). Therefore, the number of constraints imposed on H by a single pair of transformations via the similarity equation Eq. (3) can be estimated by examining the number of constraints imposed on H by an equation of the form $G=HBH^{-1}$ where $B=T_i$ and $G=T_j$. A general analysis of matrix equations of the form $GH=HB$ may be found in The theory of matrices. Chapter VIII, by F. R. Gantmakher from Chelsea Pub., New York, 1959.

The following notations are used hereinbelow:

denote by $\lambda_1, \lambda_2, \lambda_3$ the eigenvalues of the matrix B in decreasing order ($|\lambda_1| \geq |\lambda_2| \geq |\lambda_3|$);

denote by $\vec{u}_{b1}, \vec{u}_{b2}, \vec{u}_{b3}$ the corresponding eigenvectors with unit norm ($\|\vec{u}_{b1}\| = \|\vec{u}_{b2}\| = \|\vec{u}_{b3}\|$);

denote by $r_j$ the algebraic multiplicity of the eigenvalue $\lambda_j$; and denote by $V_j = \{\vec{v} \in R^n : B\vec{v} = \lambda_j \vec{v}\}$ the corresponding eigen subspace.

It is noted that:

If $\lambda_1 ? \lambda_2 ? \lambda_3$ then the algebraic multiplicity of all eigenvalues is 1 ($r_j = 1$);

If $\lambda_1 = \lambda_2 ? \lambda_3$ then the algebraic multiplicity of $\lambda_1$ and $\lambda_2$ is 2, and the algebraic multiplicity of $\lambda_3$ is 1 ($r_1 = r_2 = 2$ and $r_3 = 1$); and that If $\lambda_1 = \lambda_2 = \lambda_3$ then the algebraic multiplicity of $\lambda_1, \lambda_2,$ and $\lambda_3$ is 3 ($r_1 = r_2 = r_3 = 3$).

Similar matrices, also known as conjugate matrices, such as B and G, have the same eigenvalues but different eigenvectors. The eigenvectors of the similar matrices are related by H. If ub is an eigenvector of B with corresponding eigenvalue $\lambda$, then $Hu_b$ is an eigenvector of G with the same eigenvalue $\lambda$ so that $G(Hu_b) = \lambda(Hu_b)$. The same applies for eigen subspaces, wherein if V is an eigen subspace of B corresponding to an eigenvalue $\lambda$, then H(V) is an eigen subspace G with the same eigenvalue $\lambda$. The number of constraints imposed on H by B and G is therefore investigated according to the dimensionality of the eigen subspaces of B and G. Let V be the eigen subspace corresponding to an eigenvector $u_b$ of B. Three possible cases are valid, one case for each possible dimensionality of V, i.e., dim(V)=1, 2, 3.

$$\dim(V) = 1. \qquad \text{Case I}$$

This case typically occurs when all three eigenvalues are distinct. The case can also occur when some eigenvalues have algebraic multiplicity of two or three. In all these cases, V is spanned by the single eigenvector $u_b$. Similarly H(V) is spanned by the eigenvector $u_g$ of G. Therefore Eq. (13):

$$Hu_b = au_g$$

wherein $\alpha$ is an unknown scale factor

Eq. (13) provides three linear equations in H and one new unknown a and therefore Eq. (13) provides two new linearly independent constrains on H.

$$\dim(V) = 2. \qquad \text{Case II}$$

This case typically occurs in one of the following two cases:

(a) when there exists an eigenvalue with algebraic multiplicity two; or (b) when there is only one eigenvalue with algebraic multiplicity three.

However, the eigen subspace spanned by all eigenvectors has dimensionality of two. For example, a homography defined by pure shift ($\Delta x, \Delta y$) has the form:

$$H = \begin{bmatrix} 1 & 0 & \Delta x \\ 0 & 1 & \Delta y \\ 0 & 0 & 1 \end{bmatrix}.$$

This matrix has a single eigenvalue $\lambda_1 = \lambda_2 = \lambda_3 = 1$ with algebraic multiplicity three. The corresponding eigen subspaces has dimensionality 2. It is spanned by two linearly independent eigenvetors $[1,0,0]^t$ and $[0,1,0]^t$.

When dim(V)=2 the two eigenvectors span V, such that, for example, w.l.o.g., $u_{b1}$ and $u_{b2}$. Therefore every linear combination of $u_{b1}$ and $u_{b2}$ is also an eigenvector of B with the same eigenvalues. Similarly, every linear combination of $u_{g1}$ and $u_{g2}$ is an eigenvector of G with the same eigenvalue. Therefore Eq. (14):

$$Hu_{bj} = \alpha_j u_{g1} + \beta_j u_{g2} \text{ where } \alpha_b \text{ and } \beta_j \text{ are unknown scalars (j=1,2)}$$

Therefore, each of the two eigenvectors $ub_1$ and $ub_2$ provides 3 linear equations and 2 new unknowns. Therefore, together the two eigenvectors $u_{b1}$ and $u_{b2}$ provide 2 new linear constraints on H.

$$\dim(V) = 3. \qquad \text{Case III}$$

In this case any vector is an eigenvector and all the eigenvectors have the same eigenvalues $\lambda$. This is the case when $B \cong G \cong \lambda I$ are the identity transformation up to a scale factor, which means that there is no motion. In this case B and G provide no additional constraints on H.

The number of constraints imposed on H were counted hereinabove for a single eigen subspace. In order to count the total number of linear constraints that B and G impose on H every possible combination of eigen subspaces is analyzed according to the algebraic multiplicity of the eigenvalues. There are three such combinations:

1. $\lambda_i \neq \lambda_j \neq \lambda_k$, which implies that:
   $V_i \neq V_j \neq V_k$; and
   $\dim(V_i) \dim(V_j) = \dim(V_k) = 1$.
2. $\lambda_i = \lambda_j \neq \lambda_k$, which implies that $V_i = V_j \neq V_k$. There are two such cases:
   (a) $\dim(V_i = V_j) = 2$ and $\dim(V_k) = 1$.
   (b) $\dim(V_i = V_j) = 1$ and $\dim(V_k) = 1$.
3. $\lambda_i = \lambda_j = \lambda_k$
   In this case there is only a single eigen subspace $V = V_i = V_j = V_k$, which dimensionality may be 1, 2, or 3.

The following table summarizes the number of linearly independent constraints of each of the above cases:

| Case | Eigenvalues Algebraic Multiplicity | Eigen Subspaces dimensionality | # of Linearly independent constraints |
|---|---|---|---|
| (1) | $\lambda_i \neq \lambda_j \neq \lambda_k$ | $|V_i| = |V_j| = |V_k| = 1$ | 6 |
| (2.a) | $\lambda_i = \lambda_j \neq \lambda_k$ | $|V_i = V_j| = 2, |V_k| = 1$ | 4 |
| (2.b) | $\lambda_i = \lambda_j \neq \lambda_k$ | $|V_i = V_j| = 1, |V_k| = 1$ | 4 |
| (3.a) | $\lambda_i = \lambda_j = \lambda_k$ | $|V_i = V_j = V_k| = 1$ | 2 |
| (3.b) | $\lambda_i = \lambda_j = \lambda_k$ | $|V_i = V_j = V_k| = 2$ | 2 |
| (3.c) | $\lambda_i = \lambda_j = \lambda_k$ | $|V_i = V_j = V_k| = 3$ | 0 |

Therefore, when B and G have either two or three distinct eigenvalues, which is typical of general frame-to-frame transformations, then two independent pairs of transformations suffice to uniquely determine H, since each pair of transformations imposes 4 to 6 linearly independent constraints, and, according to the prior art, 8 independent linear constraints suffice to uniquely resolve H, up to an arbitrary scale factor. In a preferred embodiment of the present invention all available constraints from all pairs of transformation, for increased numerical stability.

In a preferred embodiment of the present invention two cameras are employed to produce two input sequences, preferably several seconds long to provide significant motion.

Referring to step 950, frame-to-frame input transformations, $T_1, \ldots, T_n$ and $T'_1, \ldots, T'_n$ are preferably extracted, for the case of the planar or distant scene, using the method described in, for example, M. Irani, B. Rousso and S. Peleg. Computing occluding and transparent motions. International Journal of Computer Vision, 12(1):5-16, January 1994.

Reference is now made to step 970 of FIG. 9. Step 970 comprises methods of robust statistics to enhance the accuracy of the transformations $T_i$ and $T'_i$. In a preferred embodiment of the present invention step 970 comprises two optional methods:

(a) Outlier rejection, designated by reference numeral 972; and (b) Coordinate renormalization, designated by reference numeral 974.

In step 972 inaccurate frame-to-frame transformations $T_i$ are preferably pruned out by employing any of the two outlier detection mechanisms known in the prior art as described hereinbelow:

(i) In a preferred embodiment of the present invention, the transformation between successive frames within each sequence are computed in both directions. The distance of the composed matrix $T_i T_i^{Reverse}$ from the identity matrix in the image space is computed, in terms of the maximal residual misalignment of pixels.

$$Reliability(T_i) = \max_{p \in I_i} \|T_i T_i^{Reverse} p - p\|. \qquad (15)$$

(ii) Alternatively, the similarity criterion of Eq. (5) is employed to verify the degree of "similarity" between $T_i$ and $T'_i$. An unreliable pair of transformations can thus be pruned out.

In step 974, optionally, any one of two methods of coordinate renormalization known in the prior art is used as described hereinbelow:

(a) The input matrices are re-normalized to increase the numerical stability, as described for example in Richard L. Hartley. In Defence of the 8-point Algorithm. In Pattern Recognition and Machine Intelligence 19 (6) June pages 580-593 1997.

(b) Input matrices are normalized so that the rows of M have approximately the same norm, using the heuristic provided in for example, Gene Golub and Charles Van Loan. Matrix Computations. The Johns Hopkins University Press, Baltimore and London, pp. 123-127, 1989.

Reference is now made to step 980 of FIG. 9.

In a preferred embodiment of the present invention, when the frame-to-frame transformations are too. small, temporal sub-sampling of the sequences can provide more significant transformations between successive frames. Preferably, temporal sub-sampling is done after recovering the temporal synchronization, in order to guarantee that temporally corresponding frames are sampled from the two video sequences.

In another preferred embodiment of the present invention the three dimensional joint motions of the two cameras are planned in advance to increase the accuracy of the computed result.

For example, in a preferred embodiment of the present invention input data are sequences of transformation $T_i$ and $T'_i$. The transformation $T_i$ and $T'_i$ are extracted from two video sequences using one of a variety of algorithms provided in the prior art. The reliability of the input data also depends on the specific algorithm used to extract the input transformations. Employing a rough approximation to the accuracy. of the different transformations $T_i$ and $T'_i$ it is possible to analyze the combinations of the transformations $T_i$ and $T'_i$ that participate in the matrix M (Eq.7). Hence by analyzing the pure 6 motions, comprising thee translation and three rotations, the stability of the derived equations can be predicted. It is appreciated that a higher stability of the derived equations results in a higher accuracy of the alignment between the sequences. For example, for the method described, for example, in M. Irani, B. Rousso and S. Peleg. Computing occluding and transparent motions. International Journal of Computer Vision, 12(1):5-16, January 1994, the accuracy of the projective parameters $T_{3,1}$ and $T_{3,2}$ is poor, the accuracy of the translation parameters $T_{1,3}$ and $T_{2,3}$ is good, and the. other parameters have fair accuracy. Therefore it is predicted that rotation within the image plane produces the most reliable set of equations.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A method implemented on a computing device for computing at least one of spatial and temporal relationships between at least first and second sequences of visual representations, wherein at least a spatial relationship between said sequences is unknown, the method comprising:

for said first and second sequences of visual representations, computing on a computing device first and second sequences of ordered intra-sequence representation-to-representation transformations, respectively; and employing at least a subset of said first and second sequences of transformations to compute on a computing device at least one of said spatial and temporal relationships for joint processing of said first and second sequences of visual representations, wherein said temporal relationship is computed from said at least a subset of sequences of transformations and wherein said spatial relationship is computed from said temporal relationship and said at least a subset of sequences of transformations.

2. A method according to claim 1 and wherein said visual representations comprise images.

3. A method according to claim 1 and wherein said representations comprise at least three-dimensional objects.

4. A method according to claim 1 and wherein said employing obtains said spatial relationship.

5. A method according to claim 1 and wherein said employing obtains said temporal relationship.

6. A method according to claim 1 and wherein said employing obtains said spatial and temporal relationship.

7. A method according to claim 1 and wherein said employing obtains said at least one of spatial and temporal relationships in the absence of a spatial overlap between said sequences of visual representations.

8. A method according to claim 1 and wherein said employing obtains said at least one of spatial and temporal relationships in the absence of common spatial information between said sequences of visual representations.

9. A method according to claim 1 and wherein said employing obtains said at least one of spatial and temporal relationships in the absence of common features between individual ones of said representations belonging to different ones of said at least first and second sequences of visual representations.

10. A method according to claim 1 and wherein said spatial relationship comprises a geometric transformation between said at least first and second sequences of representations.

11. A method according to claim 10 and wherein said spatial relationship comprises at least one of the following: at least one parameter of said geometric transformation, a projective transformation, a homogranhy, a fundamental matrix and a non-parametric transformation.

12. A method according to claim 1 and wherein said temporal relationship comprises a temporal transformation between said at least first and second sequences of representations.

13. A method according to claim 12 and wherein said temporal relationship comprises at least one of the following: at least one parameter of said temporal transformation, a time shift between said at least first and second sequences of representations and an affine transformation in time.

14. A method according to claim 1 and wherein at least some of said intra-sequence representation-to-representation transformations result from relative motion between sensors and a scene.

15. A method according to claim 14 and wherein said intra-sequence representation-to-representation transformations include motions taking place at least partially at different times.

16. A method according to claim 1 and wherein said intra-sequence representation-to-representation transformations include at least one of: projective transformations, homographies, fundamental matrices, parametric transformations and non-parametric transformations.

17. A method according to claim 1 and wherein said employing comprises at least one of the following steps:
correlating said first and second sequences of transformations;
equating properties, up to a scale factor, of said first sequence of transformations and said second sequence of transformations;
comparing properties of said first sequence of transformations and said second sequence of transformations; and
correlating properties of said first sequence of transformations and said second sequence of transformations.

18. A method according to claim 1 and wherein said spatial relationship results from an acquisition relationship between first and second sensors acquiring respective said at least first and second sequences of visual representations, said relationship being one of: fixed over time and changing in a known way over time.

19. A method according to claim 1 and wherein said at least first and second sequences of visual representations are one of the following:
acquired generally at the same time;
acquired generally at different times;
represent measurements from the same scene;
represent measurements from different portions of the same scene; and
represent measurements from different scenes.

20. A method according to claim 19 and wherein said measurements are generally the same for each sensor.

21. A method according to claim 19 and wherein said measurements are generally different for each sensor.

22. A method according to claim 1 and also comprising employing at least one of said spatial and temporal relationships for at least one of: generating wide-screen movies from multiple at least partially non-overlapping narrow field of view movies, fusing images, integrating information contained in said at least first and second sequences of representations, comparing information contained in said at least first and second sequences of representations, and finding differences between information contained in said at least first and second sequences of representations.

23. A method according to claim 1 and also comprising employing at least one of said spatial and temporal relationships for alignment of images obtained at different zooms.

24. A method according to claim 1 and also comprising employing at least one of said spatial and temporal relationships for integrating information contained in said at least first and second sequences of representations and thereby providing an information output which exceeds the optical limitations of individual sensors.

25. A method according to claim 24 and wherein said optical limitations comprise at least one of: limited spatial resolution, limited temporal resolution, limited spectral range, limited dynamic range, limited depth of focus, limited zoom, limited field of view, and limited view point.

26. A method according to claim 1 and wherein at least some of said intra-sequence representation-to-representation transformations comprise frame-to-frame transformations.

27. A system for computing at least one of spatial and temporal relationships between at least first and second sequences of visual representations, wherein at least a spatial relationship between said sequences is unknown, the system comprising:
input functionality for receiving at least one of said first sequence of representations and at least one of said second sequence of representations and for computing first and second sequences of ordered intra-sequence representation-to-representation transformations for said first and second sequences of visual representations, respectively; and
computation functionality employing at least a subset of said first and second sequences of transformations to compute at least one of said spatial and temporal relationships for joint processing of said first and second sequences of visual representations, wherein said temporal relationship is computed from said at least a subset of sequences of transformations and wherein said spatial relationship is computed from said temporal relationship and said at least a subset of sequences of transformations.

28. A system according to claim 27 and wherein said visual representations comprise images.

29. A system according to claim 27 and wherein said representations comprise at least three-dimensional objects.

30. A system according to claim 27 and wherein said computation functionality includes functionality for obtaining said spatial relationship.

31. A system according to claim 27 and wherein said computation functionality includes functionality for obtaining said temporal relationship.

32. A system according to claim 27 and wherein said computation functionality includes functionality for obtaining said spatial and temporal relationship.

33. A system according to claim 27 and wherein said computation functionality includes functionality for obtaining said at least one of spatial and temporal relationships in the absence of a spatial overlap between said sequences of visual representations.

34. A system according to claim 27 and wherein said -computation functionality includes functionality for obtaining said at least one of spatial and temporal relationships in the absence of common spatial information between said sequences of visual representations.

35. A system according to claim 27 and wherein said computation functionality includes functionality for obtaining said at least one of spatial and temporal relationships in the absence of common features between individual ones of said representations belonging to different ones of said at least first and second sequences of visual representations.

36. A system according to claim 27 and wherein said spatial relationship comprises a geometric transformation between said at least first and second sequences of representations.

37. A system according to claim 36 and wherein said spatial relationship comprises at least one of the following: at least one parameter of said geometric transformation, a projective transformation, a homography, a fundamental matrix and a non-parametric transformation.

38. A system according to claim 27 and wherein said temporal relationship comprises a temporal transformation between said at least first and second sequences of representations.

39. A system according to claim 38 and wherein said temporal relationship comprises at least one of the following: at least one parameter of said temporal transformation, a time shift between said at least first and second sequences of representations and an affine transformation in time.

40. A system according to claim 27 and wherein at least some of said intra-sequence representation-to-representation transformations result from relative motion between sensors and a scene.

41. A system according to claim 40 and wherein said intra-sequence representation-to-representation transformations include motions taking place at least partially at different times.

42. A system according to claim 27 and wherein said intra-sequence representation-to-representation transformations include at least one of: projective transformations, homographies, fundamental matrices, parametric transformations and non-parametric transformations.

43. A system according to claim 27 and wherein said computation functionality comprises at least one of the following: correlating said first and second sequences of transformations;

equating properties, up to a scale factor, of said first sequence of transformations and said second sequence of transformations;

comparing properties of said first sequence of transformations and said second sequence of transformations; and correlating properties of said first sequence of transformations and said second sequence of transformations.

44. A system according to claim 27 and wherein said spatial relationship results from an acquisition relationship between first and second sensors acquiring respective said at least first and second sequences of visual representations, said relationship being one of: fixed over time and changing in a known way over time.

45. A system according to claim 27 and wherein said at least first and second sequences of visual representations are one of the following:

acquired generally at the same time;

acquired generally at different times;

represent measurements from the same scene;

represent measurements from different portions of the same scene; and represent measurements from different scenes.

46. A system according to claim 45 and wherein said measurements are generally the same for each sensor.

47. A system according to claim 45 and wherein said measurements are generally different for each sensor.

48. A system according to claim 27 and wherein said computation functionality includes functionality for employing at least one of said spatial and temporal relationships for at least of: generating wide-screen movies from multiple at least partially non-overlapping narrow field of view movies, fusing images, integrating information contained in said at least first and second sequences of representations, comparing information contained in said at least first and second sequences of representations, and finding differences between information contained in said at least first and second sequences of representations.

49. A system according to claim 27 and wherein said computation functionality includes functionality for employing at least one of said spatial and temporal relationships for alignment of images obtained at different zooms.

50. A system according to claim 27 and wherein said computation functionality at least one of said spatial and temporal relationships for integrating information contained in said at least first and second sequences of representations and thereby providing an information output which exceeds the optical limitations of individual sensors.

51. A system according to claim 50 and wherein said optical limitations comprise at least one of: limited spatial resolution, limited temporal resolution, limited spectral range, limited dynamic range, limited depth of focus, limited zoom, limited field of view, and limited view point.

52. A system according to claim 27 and wherein at least some of said intra-sequence representation-to-representation transformations comprise frame-to-frame transformations.

* * * * *